US010213716B2

(12) United States Patent
Kitagawa et al.

(10) Patent No.: US 10,213,716 B2
(45) Date of Patent: Feb. 26, 2019

(54) ELECTRET

(71) Applicant: TOYOBO CO., LTD., Osaka-shi, Osaka (JP)

(72) Inventors: Yoshiyuki Kitagawa, Otsu (JP); Toshikatsu Enjoji, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 178 days.

(21) Appl. No.: 15/301,902

(22) PCT Filed: Mar. 31, 2015

(86) PCT No.: PCT/JP2015/060066
§ 371 (c)(1),
(2) Date: Oct. 4, 2016

(87) PCT Pub. No.: WO2015/152207
PCT Pub. Date: Oct. 8, 2015

(65) Prior Publication Data

US 2017/0113170 A1 Apr. 27, 2017

(30) Foreign Application Priority Data

Apr. 4, 2014 (JP) ................................ 2014-077732
Apr. 21, 2014 (JP) ................................ 2014-087625
Jan. 5, 2015 (JP) ................................ 2015-000069

(51) Int. Cl.

| | |
|---|---|
| *B01D 39/16* | (2006.01) |
| *B03C 3/28* | (2006.01) |
| *H01G 7/02* | (2006.01) |
| *B01D 46/00* | (2006.01) |
| *D06M 15/256* | (2006.01) |
| *D06M 101/20* | (2006.01) |
| *D06M 101/18* | (2006.01) |

(52) U.S. Cl.

CPC ..... *B01D 39/1623* (2013.01); *B01D 46/0032* (2013.01); *B03C 3/28* (2013.01); *D06M 15/256* (2013.01); *H01G 7/02* (2013.01); *B01D 2239/0435* (2013.01); *B01D 2239/0478* (2013.01); *D06M 2101/18* (2013.01); *D06M 2101/20* (2013.01); *D06M 2200/11* (2013.01)

(58) Field of Classification Search
CPC .. B03C 3/28; B01D 39/1623; B01D 46/0032; B01D 2239/0478; B01D 2239/0435; D06M 15/256; D06M 2101/20; D06M 2200/11; H01G 7/02
See application file for complete search history.

(56) References Cited

U.S. PATENT DOCUMENTS 4,948,515 A * 8/1990 Okumura .............. B01D 35/06 204/560
5,057,710 A 10/1991 Nishiura et al.
5,462,586 A * 10/1995 Sugiyama ........... B01D 39/083 96/13
5,556,618 A * 9/1996 Ando .................... H01G 7/023 424/404
6,214,094 B1 4/2001 Rousseau et al.
6,238,466 B1 5/2001 Rousseau et al.
6,261,342 B1 7/2001 Rousseau et al.
6,627,563 B1 * 9/2003 Huberty ............ B01D 39/1623 442/400
6,802,315 B2 * 10/2004 Gahan ................. B01D 39/163 128/201.17
9,289,632 B2 * 3/2016 Takeuchi ............ A62B 23/025
9,458,314 B2 * 10/2016 Usami ........................ C08J 7/08
9,508,971 B2 * 11/2016 Ikeyama ........... B01D 67/0093
2002/0005116 A1 * 1/2002 Hagglund ................ B03C 3/12 95/79
2002/0174869 A1 * 11/2002 Gahan ................. B01D 39/163 128/206.12
2006/0021302 A1 * 2/2006 Bernard ............ B01D 46/0028 55/282
2006/0159973 A1 7/2006 Kotera et al.
2006/0205864 A1 9/2006 Yamamoto et al.
2006/0243138 A1 11/2006 Spartz et al.
2008/0003384 A1 * 1/2008 Murphy ............... D06M 13/02 428/32.26
2009/0214924 A1 8/2009 Kotera et al.
2009/0293279 A1 12/2009 Sebastian et al.
2010/0269464 A1 * 10/2010 Mori ................. B01D 39/1692 55/486
2011/0024348 A1 * 2/2011 Meyer-Blumenroth .................... B01D 63/081 210/435

(Continued)

FOREIGN PATENT DOCUMENTS

JP 1-287914 A 11/1989
JP 5-190389 A 7/1993

(Continued)

OTHER PUBLICATIONS

International Search Report dated Jun. 30, 2015, issued in counterpart International Application No. PCT/JP2015/060066 (2 pages).

*Primary Examiner* — Duane Smith
*Assistant Examiner* — Sonji Turner
(74) *Attorney, Agent, or Firm* — Westerman, Hattori, Daniels & Adrian, LLP

(57) ABSTRACT

[Problems]
An object of the present invention is to provide an electret with an initial increased electrostatic charge quantity and suppressed attenuation of electrostatic charge to liquid particles.

[Means for solving]

The electret is obtained by depositing polytetrafluoroethylene having a melting point of 35° C. or higher and 320° C. or lower on a carrier and imparting an electrostatic charge to at least one of the carrier and the polytetrafluoroethylene.

8 Claims, No Drawings

(56) References Cited

U.S. PATENT DOCUMENTS

| | | |
|---|---|---|
| 2011/0105686 A1 | 5/2011 | Kashiwagi |
| 2011/0135871 A1 | 6/2011 | Yamamoto et al. |
| 2012/0123031 A1* | 5/2012 | Ishikawa ................. C08L 27/18 524/104 |
| 2013/0283744 A1* | 10/2013 | Nakamura ............... C08J 7/047 55/524 |
| 2014/0023895 A1* | 1/2014 | Ikeyama ............ B01D 67/0093 429/82 |
| 2015/0024216 A1* | 1/2015 | Usami ....................... C08J 7/08 428/422 |

FOREIGN PATENT DOCUMENTS

| | | | |
|---|---|---|---|
| JP | 2002-266219 A | 9/2002 | |
| JP | 2004-352976 A | 12/2004 | |
| JP | 2007-18995 A | 1/2007 | |
| JP | 2008-540856 A | 11/2008 | |
| JP | 2009-006313 A | 1/2009 | |
| JP | 2011-522137 A | 7/2011 | |
| JP | 2012236188 A * | 12/2012 | ......... B01D 67/0093 |
| JP | 2013-034941 A | 2/2013 | |
| JP | 2013-166859 A | 8/2013 | |
| WO | 2009/104699 A1 | 8/2009 | |

\* cited by examiner

ELECTRET

TECHNICAL FIELD

The present invention relates to an electret and a filter including the electret.

BACKGROUND ART

Conventionally, in dust respirators, various types of air conditioning elements, air cleaners, cabin filters, and various types of apparatuses, porous filters have been used for purposes of dust collection, protection, ventilation, and the like.

Among the porous filters, filters made of fibrous materials have high porosity and have advantages such as long life and low ventilation resistance, and have therefore been widely used. These filters made of fibrous materials collect particles on fibers by mechanical collecting mechanisms such as blocking, diffusion, and inertial impaction, and have been known to have the minimum value of collection efficiency of the filter when the particles have an aerodynamic equivalent particle diameter of about 0.1 to 1.0 µm in practical application environments.

To improve the collection efficiency of the filter at the above-mentioned minimum value, a method of using electric attraction in combination is known. For example, a method employed may be a method for imparting an electric charge to object particles to be collected, a method for imparting an electric charge to a filter, or a combination of both of them. For examples of the method for imparting an electrostatic charge to a filter, there is known a method of disposing a filter between electrodes and causing dielectric polarization at the time of ventilation, and a method for imparting a long life electrostatic charge to an insulating material. Particularly, the latter technique has widely been employed for an electret filter since there is no need to use energy such as an external power source.

For electret filters, to increase initial collection efficiency and also to suppress performance decrease due to attenuation of electrostatic charge at the time of processing or preserving filters, electret materials capable of being electretized and excellent in moisture-proof stability and heat-resistant stability are used.

However, electret filters have a disadvantage of decrease of electrostatic attraction caused by collection of particles, and especially, oil mist that has low surface tension markedly accelerates elimination of electric charge by thinly coating the fiber surfaces. For common electret filters, polyolefins, polyesters, polycarbonates, phenol resins, and the like, that are excellent in electric charge stability are used. However, even fibrous materials of polyolefins such as polypropylene, polyethylene, and polymethylpentene with smallest surface tension among these materials do not exhibit sufficient oil repellency as a material characteristic against oil mist represented by poly-α-olefins (PAO), dioctyl phthalate (DOP), tobacco smoke, and the like. Therefore, there is a problem that collection efficiency retention capacity at the time the oil mist is loaded (hereinafter, referred to as oil mist resistance) is low.

To solve such a problem, there is known a method of imparting oil repellency to the filter by lowering surface tension of a fibrous material composing the filter, and improving the oil mist resistance by suppressing spread of mist on the fiber surface and absorption and diffusion of mist in the inside of the fibrous material and thereby decreasing elimination of electric charge. Specifically, electrets employed are those having lowered surface tension and heightened oil mist resistance while retaining electric charge stability by a method of mixing an additive having a perfluoro group to the inside of resin to increase oil repellency (for example, Patent Document 1), a method of melt-spinning a thermoplastic fluororesin (for example, Patent Document 2 and Patent Document 3), a method of coating a surface with an emulsion processing agent containing a perfluoro group (for example, Patent Document 4), a method of introducing fluorine atoms by replacing hydrogen atoms using plasma, a fluorine gas and the like (for example, Patent Document 5), and the like.

Hereinafter, lowering surface tension of a material will be described as "oil repellency," and an effect of suppressing decrease in efficiency against oil mist will be described as "oil mist resistance." The oil repellency mentioned in the present invention means the effect of suppressing spread of a liquid by lowering surface tension, and in consideration of the principle of wetting, the oil repellency also encompasses the action against water with high surface tension value (water repellency).

However, a fluorine-based resin or a fluorine-based low molecular weight additive is unsuitable for melt spinning, since dissociation of fluoro-telomers and production of hydrogen fluoride and carbonyl fluoride as thermal decomposition products occur in environments exceeding 320° C. In addition, in the case of fluorine atom introduction by fluorine gas or a plasma treatment, in order to prevent fluorine gas leakage and suppress hydrophilization, it is necessary to strictly control the oxygen and water amounts, and special facilities with high air tightness are accordingly required. Further, because of an issue of bioaccumulation, use of PFOA (perfluorooctanoic acid), PFOS (perfluorooctanesulfonic acid) and salts thereof, as well as use of mother materials for producing telomers and production of the materials are inhibited. Thus, processes in which these materials are added, fluorine-hydrogen exchange randomly occurs, or thermal decomposition or oxidation decomposition occurs are not preferable.

Further, a fluorine-containing acrylate-based processing agent, which is developed for textiles, contains an emulsifier or a film-forming auxiliary, and includes a short chain perfluoro group equal to or shorter than $C_6F_{13}$ as a side chain to comply with PFOA and PFOS regulations and therefore, the processing agent loses crystallinity. Thus, the processing agent itself has a problem that not only the agent does not have the stability of electrostatic charge but also the agent considerably inhibits electric charge stability of a fibrous material serving as a substrate even for a small amount of deposition.

Further, also known are fluorine-based resins which have solubility and thermoplasticity by being made amorphous, and have both electric charge stability and coating suitability (for example, Patent Document 6). However, these resins have a problem that it is required to use a special monomer as a main skeleton, and the production cost significantly increases accordingly.

Still further, methods of adding various kinds of additives to improve heat resistant stability of electret materials are disclosed (for example, Patent Document 7), and there are also known methods of increasing the electric charge quantity at the time of liquid contact by mixing an electric charge-enhancing additive to improve the electrostatic charge quantity and thus improve the collection efficiency of the filter (for example, Patent Document 8).

However, the inventors of the present invention made investigations and confirmed the following problems: addition of an electric charge-enhancing additive increases the surface tension of an electret material, especially, collection of oil mist with low surface tension and thin coating of the fiber surface with the oil mist considerably accelerate elimination of electric charge.

That is, these electret filters fail to exhibit sufficient oil repellency as a material characteristic against oil mist represented by various kinds of mineral oils, plant oils, poly-α-olefins (PAO), dioctyl phthalate (DOP), tobacco smoke, or the like, and accordingly have a problem of low oil mist resistance and decrease of average collection efficiency although having high initial collection efficiency.

PRIOR ART DOCUMENT

Patent Document

Patent Document 1: Japanese Patent Laid-open Publication (Kokai) No. 2009-6313
Patent Document 2: Japanese Patent Laid-open Publication (Kokai) No. 2002-266219
Patent Document 3: Japanese Patent Laid-open Publication (Kokai) No. 2007-18995
Patent Document 4: Japanese Patent Laid-open Publication (Kokai) No. 2004-352976
Patent Document 5: Japanese Patent Laid-open Publication (Kohyo) No. 2008-540856
Patent Document 6: WO2009/104699
Patent Document 7: Japanese Patent Laid-open Publication (Kokai) No. H1-287914
Patent Document 8: Japanese Patent Laid-open Publication (Kohyo) No. 2011-522137

DISCLOSURE OF THE INVENTION

Problems to be Solved by the Invention

An electret of the present invention solves problems that conventional electrets having oil mist resistance are largely restricted in terms of production facilities and cost, and that it is difficult to simultaneously satisfy both of electric charge stability and oil repellency in the case where short chain perfluoro compounds that comply with environmental regulations are used. The present invention thus aims to provide an electret producible by a simple technique at a low cost and excellent in oil repellency, oil mist resistance, and electric charge stability.

Further, electrets containing known additives to improve the electrostatic charge exhibit more significant attenuation of electrostatic charge than electrets containing no additive in the case where liquid particles of oil mist or the like adhere thereto. Thus, the present invention also aims to provide an electret with an increased electrostatic charge quantity and suppressed attenuation of electrostatic charge to liquid particles.

Means for Solving the Problems

To solve the above-mentioned problems, the present inventors made keen investigations and finally completed the present invention. That is, the present invention is as follows.

1. An electret obtained by depositing polytetrafluoroethylene having a melting point of 35° C. or higher and 320° C. or lower on a carrier and imparting an electrostatic charge to at least one of the carrier and the polytetrafluoroethylene.

2. The electret according to above 1, wherein the carrier contains 0.01 to 15.0 wt. % of at least one of a hindered amine-based additive and a triazine-based additive.

3. The electret according to above 1, wherein the carrier contains 0.01 to 15.0 wt. % of a hindered phenol-based additive.

4. The electret according to any one of above 1 to 3, wherein the electrostatic charge is imparted by a liquid contact charging method.

5. The electret according to any one of above 1 to 4, wherein a fibrous material is used for the carrier and the polytetrafluoroethylene is deposited on the carrier by a solution method or a vapor deposition method.

6. The electret according to any one of above 1 to 5, wherein the carrier is a melt-blown nonwoven fabric made of a thermoplastic resin having a melting point of 320° C. or lower.

7. A filter comprising the electret according to any one of above 1 to 6.

Effect of the Invention

An electret of the present invention is excellent in oil repellency, oil mist resistance, and electric charge stability without using PFOA, PFOS and analogous compounds thereof by simple apparatuses and processes, and the present invention makes it possible to provide a filter including the electret. Therefore, the filter including the electret is preferably usable as dust respirators, various types of air conditioning elements, air cleaners, cabin filters, and filters aimed at protecting various types of apparatuses.

MODE FOR CARRYING OUT THE INVENTION

Hereinafter, specific examples of the present invention will be described, but optimum constitutions for every use may be selected in accordance with the purport of the present invention.

A carrier used in the present invention is not particularly limited as long as it has desired properties, but in consideration of freedom of shapes and charge stability of a material itself, a carrier made of a synthetic resin with high electric resistance is preferable. Specific examples include polyesters, polycarbonates, polyamides, polyolefins, cyclic olefins, poly(vinyl chloride), poly(vinylidene chloride), polyphenylene sulfides, polyphenylene oxides, phenol resins, and the like, which are non-fluoro synthetic resins. Among them, polyolefins such as polyethylene, polybutene, polypropylene, polymethylpentene, polystyrene, and cyclic olefins are preferable. In the case where the carrier is made of a polyolefin, an electret with good balance of hydrophobicity, electric resistance, formability, and so forth and excellent in practical utility can be obtained.

Use of a synthetic resin containing fluorine atoms for a carrier is also preferable to further improve oil repellency, and examples include polytetrafluoroethylene, perfluoroethylene-propene copolymers (FEP), perfluoroalkoxyalkanes (PFA), ethylene-tetrafluoroethylene copolymers (ETFE), polychlorotrifluoroethylene (PCTFE), poly(vinylidene fluoride) (PVDF), tetrafluoroethylene-hexafluoropropylene-vinylidene fluoride copolymers (THV), and the like. In terms of oil repellency, polytetrafluoroethylene, FEP, PFA, and ETFE are more preferable.

To suppress deterioration of resins themselves and further to improve the initial electric charge quantity and electric charge stability of an electret, conventionally known compounding agents and compounding compositions may be preferably used for the above-mentioned synthetic resins. Examples of the compounding agents may include various kinds of metal salts, antioxidants, photostabilizers, ionomer resins, or the like, and examples of the compounding compositions may include blended polymers or the like obtained by mixing different resin components. In the case where the initial charge quantity and electric charge stability for an electret are considered, at least one is preferably a synthetic resin which can be electretized.

For the above-mentioned synthetic resins, as an additive to improve the electrostatic charge, known resins may be used. Examples may include hindered amine-based additives, triazine-based additives, and hindered phenol-based additives.

The hindered amine-based additives or triazine-based additives are effective for improving the electrostatic charge and exhibit a significant effect of improving the electrostatic charge particularly in electretization by a liquid contact charging method, and therefore it is preferable. The content of the additives contained in a carrier is 0.01 to 15.0 wt. %, preferably 0.05 to 12.5 wt. %, and more preferably 0.1 to 10.0 wt. %. If the content is less than 0.01 wt. %, it is not preferable since it is impossible to cause the effect of sufficiently improving the electrostatic charge. Contrarily, if the content exceeds 15.0 wt. %, uniformity is considerably deteriorated, and therefore it is not preferable.

Further, the hindered phenol-based additives having a hydroxyl group as the terminal functional group have high durability against oil mist, and also moderate low surface tension of the surface of an electret with heightened oil repellency, slightly improve affinity to water or the like and a solvent, and impart a uniform electrostatic charge in the case where the liquid contact charging method is employed as a method for imparting an electrostatic charge, and therefore, these additives are preferable. The content of the additives in a carrier is 0.01 to 15.0 wt. %, preferably 0.05 to 12.5 wt. %, and more preferably 0.1 to 10.0 wt. %. If the content is less than 0.01 wt. %, it is impossible to cause the effect of sufficiently improving the electrostatic charge and to provide the effect of moderating the surface tension. Contrarily, if the content exceeds 15.0 wt. %, uniformity is deteriorated, the surface tension value is heightened, and the durability against liquid particles is lowered, and therefore it is not preferable.

Specific examples of the hindered amine-based or triazine-based additives include poly[((6-(1,1,3,3,-tetramethyl-butyl)imino-1,3,5-triazine-2,4-diyl)((2,2,6,6,-tetramethyl-4-piperidyl)imino)hexamethylene((2,2,6,6,-tetramethyl-4-piperidyl)imino)] (manufactured by Ciba-Geigy, CHIMASSORB (registered trade name) 944LD), dimethyl succinate-1-(2-hydroxyethyl)-4-hydroxy-2,2,6,6-tetramethylpiperidine polycondensate (manufactured by Ciba-Geigy, TINUVIN (registered trade name) 622LD), di-tert-butyl-4-hydroxybenzyl)-2-n-butyl malonate bis(1,2,2,6,6-pentamethyl-4-piperidyl) (manufactured by Ciba-Geigy, TINUVIN (registered trade name) 144), a polycondensate of dibutylamine-1,3,5-triazine-N,N'-bis(2,2,6,6-tetramethyl-4-piperidyl-1,6-hexamethylenediamine-N-(2,2,6,6-tetramethyl-4-piperidyl)butylamine (manufactured by Ciba-Geigy, CHIMASSORB (registered trade name) 2020FDL), 2-(4,6-diphenyl-1,3,5-triazin-2-yl)-5-((hexyl)oxy)-phenol (manufactured by Ciba-Geigy, TINUVIN (registered trade name) 1577FF), and the like.

The hindered phenol-based additives are not particularly limited, and specific examples include pentaerythrityl-tetrakis[3-(3,5-di-tert-butyl-4-hydroxyphenyl)propionate] (Irganox 1010, manufactured by BASF), octadecyl-3-(3,5-di-tert-butyl-4-hydroxyphenyl) propionate (Irganox 1076, manufactured by BASF), tris-(3,5-di-tert-butyl-4-hydroxybenzyl)-isocyanurate (Irganox 3114, manufactured by BASF), 3,9-bis-{2-[3-(3-tert-butyl-4-hydroxy-5-methylphenyl)-propionyloxy]-1,1-dimethylethyl}-2,4,8,10-tetraoxaspiro-[5,5]undecane (Sumilizer-GA-80, manufactured by Sumitomo Chemical Co., Ltd.), and the like.

The form of the carrier in the present invention employed may preferably be any of an injection-molded body, a film form, a fibrous material, a powdery material, and a granular material, and in the case of use for particle removal and ventilation, a fibrous material is more preferable.

The fibrous material in the present invention may encompass fibrous materials such as a woven fabric made of long fibers or short fibers, a nonwoven fabric, and a cotton material, and a fibrous material produced from a stretched film. Fibrous materials formed into a proper form with proper thickness depending on uses may be employed. In the case where an electret is used for a filter, a nonwoven fabric is preferable.

As a method of obtaining a nonwoven fabric, employable are conventionally known methods such as methods for forming sheets from single component fibers, composite fibers such as sheath-core fibers and side-by-side fibers, or short fibers such as divided fibers by carding, air-laying, wet paper making methods or the like, methods for forming sheets from continuous fibers by a spun-bonding method, a melt-blowing method, an electro-spinning method, a force-spinning method or the like. Especially, nonwoven fabrics obtained by a melt-blowing method, an electro-spinning method, or a force-spinning method which can easily obtain high density and fineness are preferable from a viewpoint of effective utilization of the mechanical collection mechanism, and nonwoven fabrics obtained by a melt-blowing method, a melt-electro-spinning method, or a melt-force-spinning method are preferable due to no necessity of treatment of a remaining solvent.

The diameter of fibers used for the fibrous material in the present invention is preferably 0.001 to 100 µm, more preferably 0.005 to 20 µm, further preferably 0.01 to 10 µm, particularly preferably 0.02 to 5 µm, and most preferably 0.03 to 3 µm. If the diameter of fibers is larger than 100 µm, it is difficult to obtain practical collection efficiency, and decrease of the efficiency at the time of electric charge attenuation is significant. If the diameter of fibers is smaller than 0.001 µm, it is difficult to impart an electrostatic charge as an electret.

The fibrous material in the present invention may be a uniform material made of a single material by a single production method, or a mixture made of two or more kinds of materials different in the production method, materials, and fiber diameter.

A method known as a method of improving durability of the fibrous material in the present invention against liquid particles of oil mist or the like is a method of imparting oil repellency by lowering surface tension of constituent fibers, lessening elimination of electric charge by suppressing spread of mist on the fiber surface and absorption and diffusion of mist in the inside of the fiber material, and improving the mechanical collection efficiency due to a clogging effect by making the collected mist close to be spherical.

Specific examples include a method of mixing an additive having a perfluoro group in the resin to heighten the oil repellency, a method of melt-spinning a thermoplastic fluororesin, a method of carrying out a coating treatment of the surface with an emulsion processing agent having a perfluoro group, and a method of introducing fluorine atoms by replacing hydrogen atoms by using such as plasma and a fluorine gas.

However, a fluorine-based resin or a fluorine-based low molecular weight additive is unsuitable for melt spinning, since production of hydrogen fluoride, carbonyl fluoride, and the like as thermal decomposition products occur. In addition, in the case of fluorine atom introduction by a fluorine gas or a plasma treatment, in order to prevent fluorine gas leakage and suppress hydrophilization, it is necessary to strictly control the oxygen and water amounts, and special facilities with high air tightness are accordingly required. Further, in the case of the fluorine gas or a plasma treatment, if a hindered amine-based additive or a triazine-based additive is used as an additive because of highly reactive fluorine radicals, reaction occurs in the N atom site of the additive and therefore, it is not preferable.

Still further, a method of using an acrylate-based processing agent developed for textiles is also available. However, such an acrylate-based processing agent developed for textiles contains an emulsifier and a film-forming auxiliary, and includes a short chain perfluoro group equal to or shorter than $C_6F_{13}$ as a side chain to comply with PFOA and PFOS regulations. Therefore, the processing agent loses crystallinity. Thus, the processing agent itself has a problem that not only the agent does not have any electret property but also it considerably hinders the electret property of a fiber material serving as a substrate even for a slight amount of deposition, and is not preferable.

Further, also known is a method of using a fluorine-based resin which is provided with solubility and thermoplasticity by being made amorphous and has both of the electret property and coating property, but the resin has a problem that a special monomer has to be used as a main skeleton and the production cost significantly increases accordingly.

To avoid the above-mentioned problems, introducing fluorine into the electret of the present invention is preferably carried out by a technique such as a solution method of dissolution in a solvent, followed by introduction, or a vapor deposition method of gasification of a fluorine-containing substance, followed by introduction.

In the electret of the present invention, polytetrafluoroethylene having a melting point of 35° C. or higher and 320° C. or lower is carried on at least a portion of a carrier to thereby impart oil repellency. The melting point of the polytetrafluoroethylene is preferably 60° C. or higher and 315° C. or lower, more preferably 80° C. or higher and 300° C. or lower, and further preferably 100° C. or higher and 290° C. or lower. If the melting point is within the above-mentioned range, polytetrafluoroethylene having molecular weight distribution may be used, and molecules with a single structure or a mixture may both be preferably usable.

The reasons for using polytetrafluoroethylene having the above-mentioned melting point include, for example, (1) high melt viscosity and coating difficulty in the case of a high molecular weight at which the melting point is 320° C. or higher, (2) deterioration of a carrier (particularly a synthetic polymer) and occurrence of a problem on heat resistance when the deposition processing temperature on a carrier is high because of a high melting point, (3) low surface tension and a high oil repellency effect of low melting point polytetrafluoroethylene (minimum surface tension 13 to 17.5 mN/m) used in the present invention, as compared with general polytetrafluoroethylene (minimum surface tension 17.5 mN/m), due to the crystal form and $CF_3$ group terminal density, (4) development of the minimum surface tension (6 mN/m) of the $CF_3$ group in the molecules on the plane due to the ordered structure of crystalline molecules in the case where epitaxial growth is employed, (5) low molecular weight and capability of a pulverization treatment, (6) capability of a physical vapor deposition treatment (PVD treatment) by heating under normal pressure, reduced pressure, or a vacuum condition because of the melting point and boiling point within practically applicable temperature ranges, (7) an advantage in terms of PFOA and PFOS regulations, differing from a plasma treatment (carbonization-fluoridation) in which control of the molecular weight of deposition components and structure is difficult, (8) suppression of the oil repellency fluctuation due to a change in molecular orientation because the polytetrafluoroethylene is solid at normal temperature and has crystallinity, (9) self-adhesive property by a heating treatment because the polytetrafluoroethylene has a melting point, and (10) solubility in a fluorine-based solvent which common high melting point polytetrafluoroethylene does not have.

Examples of a method of depositing the polytetrafluoroethylene used in the present invention on the carrier using the above-mentioned characteristics may include (1) a method for fixation by scattering granulated polytetrafluoroethylene particles and carrying out a heating treatment at a temperature higher than or equal to the melting point of a carrier or the polytetrafluoroethylene, (2) a method for fixation by dispersing polytetrafluoroethylene particles in air flow, thereby penetrating the carrier surface and inside with the particles, and thereafter carrying out a heating treatment at a temperature higher than or equal to the melting point of the carrier or the polytetrafluoroethylene, (3) a method for fixation by dispersing polytetrafluoroethylene particles in a liquid, coating and penetrating the carrier with the particles, thereafter drying out and removing the liquid, and carrying out a heating treatment at a temperature higher than or equal to the melting point of the carrier or the polytetrafluoroethylene, (4) a method for fixation by transpiring polytetrafluoroethylene at a temperature higher than or equal to the melting point and lower than or equal to the thermal decomposition temperature, cooling and solidifying the polytetrafluoroethylene on a carrier, and carrying out a heating treatment at a temperature higher than or equal to the melting point of the polytetrafluoroethylene if necessary, (5) a method for melt-fixation by depositing polytetrafluoroethylene on a carrier by a sputtering method and carrying out a heating treatment at a temperature higher than or equal to the melting point of the polytetrafluoroethylene if necessary, and (6) a method for melt-fixation by dissolving polytetrafluoroethylene in a solvent, carrying out the so-called coating process by application, spraying, or immersion for a carrier, thereafter removing the solvent, and, if necessary, carrying out a heating treatment at a temperature higher than or equal to the melting point of the polytetrafluoroethylene.

These techniques may be employed solely or in combination. For example, employment of a method for deposition in a powder form and thereafter transpiration and re-deposition by carrying out reheating, a method for adhesion and fixation by deposition in a particle form and thereafter contact of a solvent with polytetrafluoroethylene or with a carrier, and the like can improve various characteristics such as adhesion, dispersibility, oil repellency, and heat resistance.

In the methods for directly scattering particles or dispersing particles in a liquid or air flow and depositing the particles, the particle diameter of polytetrafluoroethylene is preferably 0.1 nm or more and 10 µm or less, more preferably 1 nm or more and 1 µm or less, further preferably 5 nm or more and 500 nm or less, and most preferably 10 nm or more and 300 nm or less. In the case where the particle diameter is more than 10 μm, uniformity at the time of dispersion and handling become difficult, and the thickness of the coating is too large. On the other hand, if the particle diameter is less than 0.1 nm, it becomes difficult to retain the characteristics as polytetrafluoroethylene molecules of straight chains. Especially, in the case where the dimension and form of the carrier itself are particular, fine particles are preferable in terms of uniformity and retention of the dimension.

Examples of techniques for adjusting the above-mentioned particle diameter may include (1) a method for adjustment at the time of polymerization such as emulsion polymerization and suspension polymerization in form of particles, (2) a method for pulverization by physical action such as impact or friction, and (3) a method for granulation by a technique of dissolution in a fluorine-based solvent, supercritical carbon dioxide, and the like, followed by such as spraying or reprecipitation. A preferable technique may be selected according to the intended particle diameter. In the case of particles obtained by emulsion polymerization or suspension polymerization, the particles may be used as the processing agent as they are in the form of a solid-liquid mixture, or the particles may be obtained after a drying step.

The method for pulverization by physical action can be executed by using various types of pulverizers of either wet type or dry type. Specifically, for example, a ball mill, a bead mill, a jet mill, a homogenizer, and the like can be used, and these pulverizers may be preferably used for pulverization simultaneously with emulsification and suspension.

In the case of dispersion in a liquid, examples of a preferably usable dispersant may include water, hydrocarbon-based organic solvents, halogen-based organic solvents, or the like, and two or more kinds may be preferably used in form of a mixture. In the case where an organic solvent is used, the penetration property and uniformity of coating can be heightened owing to the affinity with the synthetic resin used as a carrier. In the case where water is used as a dispersant, various kinds of surfactants may be used.

The surfactant used at the time of dispersing preferably has a boiling point or a thermal decomposition temperature of 320° C. or lower, more preferably 250° C. or lower, further preferably 200° C. or lower, and most preferably 150° C. or lower. The surfactant is preferably transpired by a heating treatment or inactivated by thermal decomposition since it hinders impartation of oil repellency and the electret property.

Another surfactant removal method preferably employed may be hydrolysis with an acid or alkaline solution, oxidation decomposition with hypochlorous acid, hydrogen peroxide, or the like, as well as a method of blocking functional groups with a reactive organic substance having a glycidyl group, metal ions, metal alkoxides, or the like.

The polytetrafluoroethylene used in the present invention has a melting point of 320° C. or lower, which is the thermal decomposition temperature, and is confirmed to have a clear evaporating and transpiring property at a temperature equal to or higher than the melting point. Accordingly, it is also preferable to carry out deposition on a carrier by a vapor deposition method. Regarding the melting point, for example, at normal pressure (1 atmospheric pressure in ambient air), the polytetrafluoroethylene has a melting point of 36° C. in the case of $n\text{-}C_{10}F_{22}$; a melting point of 76° C. in the case of $n\text{-}C_{12}F_{26}$; a melting point of 103° C. in the case of $n\text{-}C_{14}F_{30}$; a melting point of 125° C. in the case of $n\text{-}C_{16}F_{34}$; a melting point of 167° C. in the case of $n\text{-}C_{20}F_{42}$; and a melting point of 219° C. in the case of $n\text{-}C_{31}F_{64}$.

Further, low molecular weight PTFE Cefral Lube V manufactured by Central Glass Co., Ltd., as a commercialized mixture, has a melting point in a range of 100 to 290° C. (peak temperature of 270° C.), and can be used as a vapor deposition source by heating at a temperature at which melting starts or higher. The PTFE is preferably used by heating at 290° C. or higher and 320° C. or lower at which it is entirely liquified.

The polytetrafluoroethylene exhibits stability as a solid at the time of use, has characteristics as a liquid or a gas at the time of being heated, and is thus preferably usable as a material for a physical vapor deposition method (PVD method). When heated at the thermal decomposition temperature or lower, the polytetrafluoroethylene can maintain its structure, and accordingly has advantageous characteristics to a plasma treatment which produces fluoropolymers unstable in terms of molecular weight and structure, or to a thermal decomposition vapor deposition method at a high temperature using high molecular weight polytetrafluoroethylene as a raw material.

A technique for vapor deposition process to be employed may be a method of heating tetrafluoroethylene with various kinds of heat sources to generate vapor and depositing tetrafluoroethylene in form of liquid droplets or crystals on the carrier surface held at a lower temperature. As such a technique, either a batch method of treating the entire surface to be processed at a time or a continuous method of continuously treating different surfaces of a carrier to be processed may be preferably employed.

The vapor deposition process in the present invention may be carried out preferably under any of an elevated pressure, normal pressure, reduced pressure, vacuum state, pressure swing among these pressures, and in either an air atmosphere or an inert gas atmosphere.

It is made possible to improve the transpiration speed and lower the transpiration temperature by reducing the pressure or producing a vacuum state, and it is made possible to accelerate precipitation of transpired substances by pressurization. Further, producing a vacuum or inert atmosphere can suppress oxidation of polytetrafluoroethylene or a carrier, but in the present invention, a low temperature treatment at the thermal decomposition temperature or lower is possible and therefore, an air atmosphere may be employed in terms of the cost.

In the present invention, adjustment of the deposition conditions for polytetrafluoroethylene makes it possible to achieve a preferable adhesion state depending on the purposes. Especially, in the case of a porous structure such as a fibrous material, polytetrafluoroethylene which has a wide average free path of molecules unevenly exists on the carrier surface at the transpiration side when the degree of vacuum is high, and in the case of low vacuum, normal pressure, or elevated pressure, the uniformity can be improved owing to turning around of polytetrafluoroethylene. To adjust the adhesion surface, pressure swing or a treatment of changing the surfaces (front surface and back surface) to be processed of a single carrier is also a preferable method.

In the present invention, at the time of vapor deposition process or after the vapor deposition process, a carrier is preferably treated at 60° C. or higher and 140° C. or lower, more preferably at 70° C. or higher and 140° C. or lower, and further preferably at 80° C. or higher and 140° C. or lower. This is because the treatment as described above improves adhesion to a carrier, causes a stabilization effect on an electret owing to removal of low molecular weight substances, and lessens VOC components which may be separated. Specifically, a method to be employed may be a method which enables the adjustment by decreasing or increasing a vapor deposition bath temperature and cooling or heating a carrier at the time of vapor deposition process, and involves heating after the processing.

In the present invention, cooling solidification may be carried out after deposition in the vapor state, or adhesion in form of a liquid or solid particles after aggregation is also preferable. Depositing polytetrafluoroethylene on the carrier surface in a manner of forming a finely uneven structure can improve the oil repellency, and increase the total electric charge quantity and the surface area capable of collecting oil mist owing to the increase of the carrier surface area.

Also preferable is a method of simultaneously supplying high melting point polytetrafluoroethylene and organic or inorganic particles to serve as condensation cores to the atmosphere in which vapor of the polytetrafluoroethylene exists.

The above-mentioned finely uneven structure is preferably finer than liquid droplets to be collected. This is because not only the wet work increases owing to the increase of the surface area, but also a highly oil-repellent surface in accordance with the Cassie-Baxter theory can be obtained owing to the existence of an air layer between the deposited particles and the carrier.

Since polytetrafluoroethylene having a melting point of 330° C. or higher has a molecular weight from several tens of thousands to several hundreds of thousands, it can be dissolved in neither a hydrocarbon-based solvent nor a halogen solvent. Contrarily, polytetrafluoroethylene having a melting point of 35° C. or higher and 320° C. or lower used in the present invention is insoluble in a hydrocarbon-based solvent but soluble in a fluorine-containing solvent containing hydrochlorofluorocarbon (HCFC), perfluorocarbon (PFC), hydrofluorocarbon (HFC), hydrofluoroether (HFE), a cyclic fluoride as well as an aromatic fluoride, and therefore usable as a solvent type coating agent.

In use as the coating agent, a conventionally known method may be employed. Polytetrafluoroethylene used in the present invention may be deposited on a carrier by a technique of application, spraying, immersion or the like in a state that at least a portion of the polytetrafluoroethylene is dissolved in the above-mentioned solvent, followed by a heating treatment, if necessary, to give a coating layer.

Regarding the above-mentioned coating process method, a preferable method may be employed depending on the form of a carrier. If a carrier has a porous form such as in a fibrous material or a granular material, production is possible not only by continuous process in a plane form but also by immersion in a solvent in a roll form, in a laminate, or the like, followed by drying.

The coverage rate and unevenness of a coating layer can be adjusted by the application amount and application concentration. In the case of use as a coating agent, a method of previously coating a structure having unevenness by fine particles, or the coating agent containing fine particles is also preferable.

As the fine particles to be mixed in advance as a coating agent, polytetrafluoroethylene which is not yet dissolved or an organic or inorganic material having a glass transition temperature or a melting point of 40° C. or higher can be used. The particle diameter is preferably 0.1 nm or more and 10 μm or less, more preferably 1 nm or more and 1 μm or less, further preferably 5 nm or more and 500 nm or less, and most preferably 10 nm or more and 300 nm or less. In the case of particles having an aspect ratio exceeding 1, the minor axis is defined as the diameter.

Similarly to the vapor deposition process, deposition of polytetrafluoroethylene on the carrier surface is preferably made into an uneven structure, and the uneven structure is preferably finer than liquid droplets to be collected. This is because not only the wet work increases owing to the increase of the surface area, but also a highly oil-repellent surface in accordance with the Cassie-Baxter theory can be obtained owing to the existence of an air layer between the deposited particles and the carrier.

In the present invention, at the time of the coating process or after the coating process, it is preferable to carry out a heating treatment preferably at 60° C. or higher and 140° C. or lower, more preferably at 70° C. or higher and 140° C. or lower, further preferably at 80° C. or higher and 140° C. or lower. This is because the treatment as described above improves the adhesion, stabilizes the structure of polytetrafluoroethylene molecules, causes an effect of stabilizing oil repellency and the electret owing to removal of low molecular weight substances, and removes separated low molecular weight components.

An electret in the present invention and a filter including the electret are obtained by electretizing at least one of a carrier and polytetrafluoroethylene and imparting an electrostatic charge thereto. An electretization method is not particularly limited as long as it can provide desired characteristics at the time of use, and may be employed either before deposition or after deposition of polytetrafluoroethylene. The former is advantageous in terms of the adhesion and processing by attracting a polytetrafluoroethylene powder due to electrostatic attraction, and the latter can cause a better electret effect since the electrical line of force are not shielded.

As a specific electretization method, any method can be selected from known methods for carrying out charging, such as a corona charging method, a liquid contact charging method, a friction charging method, an electric field charging method, a hot electric field charging method, and an electron beam irradiation method. Especially, in the case of giving an electrostatic charge to a material in a porous form, such as gathered fibers, a liquid contact charging method which can evenly give an electrostatic charge to the inside of the porous form is preferable. The liquid contact charging method is a method of charging by liquid contact through a jet flow or a liquid droplet current of water, a solution, or a solvent, vapor, an ultrasonic wave, or the like. Specifically, in the case where water is used, examples may include water current suction charging, high pressure water current charging, ultrasonic charging, or the like.

As a specific electretization method, conventionally known methods based on electric action, such as polarization by high voltage, charged ion collision, and injection of charged particles, interaction with a solid by friction, collision, or the like, and utilization of contact and collision with a liquid can be preferably employed. More preferably, a method utilizing contact or friction with a liquid is a more preferable method in terms of oil repellency and oil mist resistance, since electretization is possible without increasing oxidation products having polarity.

Regarding an electret of the present invention, a performance increase rate as compared with a non-electret having no electric charge (in a non-charged state), as described below, is preferably 400% or more, more preferably 800% or more, further preferably 1200% or more, and most preferably 1600% or more.

The performance increase rate can be calculated from the collection efficiency for 0.3 to 0.5 μm airborne dust at a media velocity of 10 cm/s. Hereinafter, the collection efficiency in a non-charged state will be described as "efficiency with no charge" and the collection efficiency after charging will be described as "efficiency after charging".

Performance increase rate [%]=100×[ln(1−efficiency after charging (%)/100)]÷[ln(1−efficiency with no charge (%)/100)]

Regarding an electret of the present invention, the electric charge stability required at the time of use and preservation of a filter and at the time of the forming process is preferably 10% or more, more preferably 30% or more, further preferably 70% or more, even more preferably 80% or more, and most preferably 90% or more in terms of the performance retention rate as described below. The performance retention rate can be calculated from the collection efficiency for 0.3 to 0.5 μm airborne dust at a media velocity of 10 cm/s before and after the electret is left standing still in an atmosphere of 80° C. for 30 minutes (heat treatment). Hereinafter, the collection efficiency before heating treatment will be described as "efficiency after charging (or efficiency before heating treatment)" and the collection efficiency after heating treatment will be described as "efficiency after heating treatment".

Performance retention rate [%]=100×[ln(1−efficiency after heating treatment (%)/100)]÷[ln(1−efficiency after charging (%)/100)]

Regarding the oil repellency obtained by the present invention, adjustment is possible depending on the characteristics required (for example, water-proofness, anti-fouling property, water-repelling property, and oil-repelling property). For example, in the case of use as a filter made of a fibrous material such as a nonwoven fabric or a woven fabric, a filter can be preferably used if the filter has oil repellency at least better than that of a non-processed product (for example, 36 mN/m as a representative value in a PP melt blown fabric) as represented by surface tension giving penetrability within 10 seconds in a surface tension test liquid employed in JIS K6768 and the AATCC118 method. Specifically, the surface tension is preferably 31 mN/m or less, more preferably 29 mN/m or less, further preferably 27 mN/m or less, and most preferably 25 mN/m or less. These values are defined in consideration of mineral and plant oil mist for practical use, on the basis of surface tensions of 31 mN/m to DOP, which is a test liquid for an oil mist national test for dust respirators, and 29 mN/m to PAO (for example, Emery 3004). According to the investigations by the present inventors, the oil repellency in form of a sheet and the oil resistance as a filter have a correlation, and if oil repellency sufficient for preventing absorption by capillarity is provided, the filter is confirmed to have clear oil resistance (suppression of decrease in efficiency). This is because the oil resistance (contact angle) of a material surface and the absorption phenomenon in a porous body have a correlation, and the oil resistance has a correlation with the contact angle and collection state of aerosol collected on the fiber surface at the time of a mist test. Further, the surface tension value of the tobacco smoke itself, which is a mixture, is unclear, but together with decrease of the penetrability with the above-mentioned liquid, a clear effect of improving durability can be confirmed.

In the case where an electret of the present invention is used as a filter, it is also preferable to stack a fiber layer having an oil-absorbing or water-absorbing function (hereinafter, referred to as a "liquid-absorbing layer"). Use of the liquid-absorbing layer having a liquid-absorbing function such as oil absorption and water absorption suppresses dripping of liquid droplets formed due to oil repellency, and transfers and diffuses the liquid droplets from the electret surface, so that loss of the electret property and increase of ventilation resistance can be suppressed.

A material for the liquid-absorbing layer is not particularly limited as long as it can absorb liquid droplets, and those preferably usable are fiber sheet materials made of polypropylene, polyethylene, polystyrene, polyamide, polyacrylonitrile, polyester, polycarbonate, cellulose, rayon, or the like, and sheet materials containing porous materials such as activated carbon, zeolite, and pulp in voids or surface-processed with the porous materials. Olefin-based materials such as polypropylene, polyethylene, and polystyrene or polyesters are more preferable, and polypropylene is further preferable.

It is preferable to use one kind or two or more kinds of fibers in combination for the liquid-absorbing layer, and proper materials can be selected from a viewpoint of ventilation resistance, collection of coarse particles, and the like.

A material to be preferably used as the liquid-absorbing layer may be either a non-electret or an electret, and is more preferably electretized.

A method of forming the liquid-absorbing layer is not particularly limited as long as it can give desired characteristics, and those usable are materials made into sheets by a preferable method such as a thermal bonding method, a spun-bonding method, a span lace method, an electrospinning method by a melting and solution method, as well as a force spinning method, or the like.

The diameter of fibers composing the liquid-absorbing layer is preferably 0.005 to 100 μm, more preferably 0.01 to 20 μm, further preferably 0.5 to 5 μm, and most preferably 1 to 10 μm.

Further, the layer can be used in combination with another constituent member if necessary. That is, combination use with a pre-filter layer, a fiber protection layer, a reinforcing member, or a functional fiber layer and the like is also preferable.

Examples of the pre-filter layer and the fiber protection layer may include spun bond nonwoven fabrics, thermal bond nonwoven fabrics, foamed urethane, or the like, and examples of the reinforcing member may include thermal bond nonwoven fabrics, various kinds of nets, or the like. Further, examples of the functional fiber layer may include such as fiber layers made antibacterial, antivirus, or colored for purposes of identification and design. Imparting these functions to the liquid-absorbing layer is preferable as a method of decreasing the thickness and the ventilation resistance.

An electret of the present invention and a filter including the electret can be used widely owing to the functions such as dust collection, protection, ventilation, anti-fouling, and water-proofness provided by the present invention, and especially preferably usable as dust respirators, various types of air conditioning elements, air cleaners, cabin filters, and filters aimed at protection of various kinds of apparatuses.

EXAMPLES

Hereinafter, modes for carrying out the present invention will be described. Testing methods will be described below.
(Method of Testing Oil Repellency)

The method of testing oil repellency was carried out by the following test.

In the JIS K6768 method, test liquids having a surface tension of 40.0 mN/m to 25.4 mN/m were prepared in accordance with the composition defined in JIS K6768.

In the AATCC118 method, test liquids of first grade to eighth grade defined in the AATCC118 method were prepared.

In the PAO method, PAO (Emery 3004) was prepared as a test liquid.

In each testing method, each test liquid was dropped in an amount of each 20 μl to each test sample surface by a micropipette for a microbial test, and the penetration degree was observed after 10 seconds of leaving the test sample standing still.

In the JIS K6768 method, the test liquid was dropped starting from the test liquid having a surface tension of 40.0 mN/m, and the value of the test liquid which was dropped immediately before a test liquid found penetrative and which was unpenetrative was used as the result of the oil repellency test.

In the case where the test liquid having a surface tension of 40.0 mN/m was penetrative, the test result was defined as 40.0 mN/m since there was no test liquid which was dropped immediately before and which was unpenetrative. Further, in the case where the test liquid having a surface tension of 25.4 mN/m was unpenetrative, the test result was defined as 25.4 mN/m since there was no test liquid which was penetrative.

In the AATCC118 method, the test liquid was dropped starting from the first grade test liquid, and the value of the test liquid which was dropped immediately before a test liquid found penetrative was used as the result of the oil repellency test.

In the case where the first grade test liquid was penetrative, the test result was defined as 0 grade since there was no test liquid which was dropped immediately before and which was unpenetrative. Further, in the case where the eighth grade test liquid was unpenetrative, the test result was defined as the eighth grade since there was no test liquid which was penetrative.

In the PAO method, in the case where the test liquid was penetrative, the result was defined as x, and in the case where the test liquid was unpenetrative, the result was defined as ○.

Additionally, in the case where there was a difference between the front surface and the back surface, the lower oil repellency was employed as the test result.

(Collection Efficiency Test)

The collection efficiency test in the initial period and after heat loading in the filter was carried out by the following method.

Evaluation particles: Airborne dust
Media velocity: 10 cm/s
Calculation of efficiency: The number of particles of 0.3 to 0.5 μm by a light-scattering calculation method.

$$\text{Collection efficiency (\%)} = (1 - (\text{number of particles at downstream side} \div \text{number of particles at upstream side})) \times 100$$

(Performance Increase Rate)

The performance increase rate (degree of electretization) of each electret was evaluated by the following method. Each sheet sample after fluorine processing was subjected to an electric charging (electretizing) treatment, and thereafter the collection efficiency (efficiency after charging) was measured. Further, the sheet was impregnated with an aqueous 0.5% perfluoroalkyl group-containing carboxylic acid solution containing MegaFac F410 (manufactured by DIC Co., Ltd.) and dried to be brought into a state where it had no electrostatic charge including natural electric charge (non-charged state), and then, the collection efficiency (efficiency with no charge) was measured again.

* This technique aims to evaluate the electric charge contribution by a method of eliminating an electrostatic charge and causing no effect on ventilation resistance and collection efficiency of a fibrous material.

The performance increase rate was calculated according to the following equation.

$$\text{Performance increase rate [\%]} = 100 \times [\ln(1-\text{efficiency after charging (\%)}/100)] \div [\ln(1-\text{efficiency with no charge (\%)}/100)]$$

((Performance Retention Rate)

The performance retention rate was calculated by the following method.

Each sheet sample after fluorine processing was subjected to an electric charging (electretizing) treatment and thereafter the collection efficiency (efficiency after charging) was measured. The collection efficiency (efficiency after heating treatment) was measured again after heating in an atmosphere of 80° C. for 30 minutes (after heating treatment) and the performance retention rate was calculated according to the following equation.

$$\text{Permeability (\%)} = (\text{number of particles at downstream side} \div \text{number of particles at upstream side})$$

$$\text{Performance retention rate [\%]} = 100 \times [\ln(1-\text{efficiency after heating treatment (\%)}/100)] \div [\ln(1-\text{efficiency after charging (\%)}/100)]$$

(Oil Mist Resistance Test)

The test of load resistance to oil mist (oil mist resistance) was executed by the following two methods.

PAO mist was used as mineral particles with low polarity, and tobacco smoke was used as composite particles containing water and various types of polar molecules.

(Method 1 for Testing Oil Mist Resistance: PAO Durability Life)

Each sample punched into 72 mm φ was attached to an adapter having an effective ventilation diameter of 50 mm φ and ventilation was carried out in the following conditions.

Evaluation apparatus: TSI-8130 type filter tester
Air quantity: 6 L/min (5 cm/s)
Loaded particles: Equilibrium electric charge of PAO (Emery 3004)
Number modal diameter 0.184 μm
Concentration: 100 mg/m$^3$
Particle detection method: Light scattering concentration method Particle loading was performed continuously, and the moment when the collection efficiency in the above-mentioned apparatus reached 50% was defined as an endpoint of the evaluation. The weight of PAO collected on 50 mm of the sample was calculated on the basis of the weight before and after the test.

(Method 2 for Testing Oil Mist Resistance: Tobacco Smoke Durability Life)
[Tobacco Smoke Loading]

Four cigarettes of MEVIUS manufactured by Japan Tobacco Inc, were burned in a 1 m$^3$ acrylic container with a smoke filter by a technique according to JEM1467 method. Each sample punched into 72 mm φ was attached to an adapter having an effective ventilation diameter of 50 mm φ, and ventilation was carried out at an air quantity of 12 L/min for 10 minutes. The particle concentration as a reference was decreased from 4000 CPM to 3000 CPM by digital powder dust meter P-2L manufactured by Sibata Scientific Technology Ltd., and the load quantity was approximately 1 cigarette/cycle. The efficiency (the following) in the initial period and each 1-cycle loading and the weight were measured, and the moment when the efficiency became less than 50% was defined as an end point. The collection efficiency and the collected weight of tobacco smoke were plotted in the axis of ordinates and the axis of abscissas as ordinal axes, and the numerical value at the moment when the efficiency reached 50% was calculated as the read durability life.

[Collection Efficiency at the Time of Tobacco Smoke Loading]

In the case where a sample after tobacco smoke loading was used, efficiency evaluation was carried out by a light scattering concentration method since a light scattering counter (laser particle counter) caused interference in the particle diameter measurement. Additionally, it was confirmed that the collection efficiency was almost coincident with the efficiency of 0.3 to 0.5 µm by the laser particle counter.

Each sample bearing tobacco smoke loading was attached to an adapter having an effective ventilation diameter of 50 mm φ and ventilation was carried out in the following conditions.

Evaluation apparatus: TSI-8130 type filter tester
Air quantity: 6 L/min (5 cm/s)
Loaded particles: Equilibrium electric charge of solid NaCl (generated from 2 wt. % NaCl solution)
Number modal diameter 0.075 µm
Concentration: 200 mg/m$^3$
Particle detection method: Light scattering concentration method Additionally, since the evaluation air quantity was small, the value of 20 seconds was set as the time taken for the upper and lower detectors to be equilibrium, and the numerical value in the filter tester mode of 1 cycle (efficiency measurement mode) was employed.

Examples 1-1 to 1-5

Polytetrafluoroethylene of n-$C_{10}F_{22}$, n-$C_{12}F_{26}$, n-$C_{14}F_{30}$, n-$C_{16}F_{34}$, and n-$C_{20}F_{42}$ dissolved in perfluoroheptane was made to infiltrate into polypropylene nonwoven fabrics obtained by a melt blown method and having a basis weight (weight per unit area) of 30 g/m$^2$, an average fiber diameter of 3 µm, and a thickness of 0.25 mm, and then the fabrics were dried at normal temperature to give processed sheets each having a deposition amount of 0.75 g/m$^2$.

Each of the obtained sheets was subjected to the oil repellency test by liquid droplets, and at the same time subjected to an electretization treatment by a corona discharge method and various kinds of evaluations were carried out. The results are shown in Table 1-1.

Example 1-6

Treatments and various kinds of evaluations were carried out in the same manner as those in Examples 1-1 to 1-5, except that polytetrafluoroethylene having a melting point in a range of 100° C. to 290° C. (Cefral Lube V manufactured by Central Glass Co., Ltd.) was dispersed in perfluoroheptane and the portions of supernatant were used. The results are shown in Table 1-1.

Example 1-7

Treatments and various kinds of evaluations were carried out in the same manner as those in Example 1-6, except that the electretization treatment was carried out by penetrating a polypropylene nonwoven fabric with pure water. The results are shown in Table 1-1.

Examples 1-8 to 1-12

Polypropylene nonwoven fabrics obtained by a melt blown method and having a basis weight (weight per unit area) of 30 g/m$^2$, an average fiber diameter of 3 µm, and a thickness of 0.25 mm were stuck to a thermostat plate kept at 30° C. and placed on the ceiling of a reaction container made of cylindrical ceramic. A hot plate heated to 300° C. was placed on the bottom part and polytetrafluoroethylene of n-$C_{10}F_{22}$, n-$C_{12}F_{26}$, n-$C_{14}F_{30}$, n-$C_{16}F_{34}$, and n-$C_{20}F_{42}$ was transpired each from a metal board to give processed sheets having a deposition amount of 0.75 g/m$^2$.

Each of the obtained sheets was subjected to an aging treatment at 60° C. for 15 minutes, and then an electretization treatment was carried out by a corona discharge method and various kinds of evaluations were carried out. The results are shown in Table 1-2.

Example 1-13

Treatments and various kinds of evaluations were carried out in the same manner as those in Examples 1-8 to 1-12, except that polytetrafluoroethylene having a melting point in a range of 100° C. to 290° C. (Cefral Lube V manufactured by Central Glass Co., Ltd.) was used. The results are shown in Table 1-2.

Example 1-14

Treatments and various kinds of evaluations were carried out in the same manner as those in Example 1-13, except that the electretization treatment was carried out by penetrating a polypropylene nonwoven fabric with pure water. The results are shown in Table 1-2.

Comparative Example 1-1

Polypropylene nonwoven fabrics obtained by a melt blown method and having a basis weight (weight per unit area) of 30 g/m$^2$, an average fiber diameter of 3 µm, and a thickness of 0.25 mm were subjected to an electretization treatment by a corona discharge method to give processed sheets and various kinds of evaluations were carried out. The results are shown in Table 1-3.

Comparative Example 1-2

Low molecular weight polytetrafluoroethylene (Lubron L-2, manufactured by Daikin Industries, Ltd.) having a melting point of 330° C. was dispersed in perfluoroheptane and the supernatant portion was used for deposition to polypropylene nonwoven fabrics obtained by a melt blown method and having a basis weight (weight per unit area) of 30 g/m$^2$, an average fiber diameter of 3 µm, and a thickness of 0.25 mm, but did not dissolve. After the treatment with the perfluoroheptane solution, drying was carried out, but no weight increase was observed. An electretization treatment was carried out by a corona discharge method and various kinds of evaluations were carried out. The results are shown in Table 1-3.

Comparative Example 1-3

Treatments were carried out in the same manner as those in Example 13, except that low molecular weight polytetrafluoroethylene (Lubron L-2, manufactured by Daikin Industries, Ltd.) having a melting point of 330° C. was used, but no transpiration occurred and no weight increase was observed. An electretization treatment was carried out by a corona discharge method and various kinds of evaluations were carried out. The results are shown in Table 1-3.

Comparative Example 1-4

Unidyne TG-5502 manufactured by Daikin Industries, Ltd., a $C_6$ acrylate-based water-repelling and oil-repelling agent, in form of a water dispersion was used for penetrating polypropylene nonwoven fabrics obtained by a melt blown method and having a basis weight (weight per unit area) of 30 g/m$^2$, an average fiber diameter of 3 μm, and a thickness of 0.25 mm and dried to deposit in an amount of 1.02 g/m$^2$, whereby processed sheets were obtained. Various kinds of evaluations were carried out. The results are shown in Table 1-3.

Comparative Example 1-5

Treatments and various kinds of evaluations same as those in Comparative Example 1-4 were carried out, except that the deposition amount was changed to 0.27 g/m$^2$. The results are shown in Table 1-3.

TABLE 1-1

|  |  | Example 1-1 | Example 1-2 | Example 1-3 | Example 1-4 | Example 1-5 | Example 1-6 | Example 1-7 |
|---|---|---|---|---|---|---|---|---|
|  | carrier | PP | PP | PP | PP | PP | PP | PP |
|  | process method | solution | solution | solution | solution | solution | solution | solution |
|  | polytetrafluoroetylene | n-$C_{10}F_{22}$ | n-$C_{12}F_{26}$ | n-$C_{14}F_{30}$ | n-$C_{16}F_{34}$ | n-$C_{20}F_{42}$ | Cefral Lube V | Cefral Lube V |
|  | deposition amount [g/m$^2$] | 0.75 | 0.75 | 0.75 | 0.75 | 0.75 | 0.75 | 0.75 |
|  | melting point [° C.] | 36 | 76 | 103 | 125 | 167 | 100-290 | 100-290 |
|  | charging method | corona discharge | corona discharge | corona discharge | corona discharge | corona discharge | corona discharge | liquid contact |
| testing oil repellency | oil repellency [mN/m] | 25.4 | 25.4 | 25.4 | 25.4 | 25.4 | 25.4 | 25.4 |
|  | AATCC118 [grade] | 6 | 6 | 6 | 5 | 5 | 5 | 5 |
|  | PAO penetrative resistance | ○ | ○ | ○ | ○ | ○ | ○ | ○ |
| oil mist resistance test | tabacoo smoke durability life [mg/sheet] | 33.2 | 32.5 | 31.6 | 30.2 | 29.7 | 30.4 | 38.5 |
|  | PAO durability life [mg/sheet] | 26.1 | 25.6 | 24.4 | 23.8 | 23.5 | 24.2 | 30.7 |
| collective efficiency test | efficiency after charging [%] | 96.8 | 97.1 | 97.3 | 97.4 | 97.2 | 97.2 | 99.92 |
|  | efficiency with no charge [%] | 31.2 | 30.3 | 30.5 | 32.2 | 31.8 | 33.1 | 32.3 |
|  | performanfce increase [%] | 920 | 981 | 993 | 939 | 934 | 890 | 1828 |
|  | efficiency after charging [%] | 96.5 | 97.2 | 97.3 | 97.0 | 97.7 | 97.4 | 99.90 |
|  | efficiency after heating [%] | 49.2 | 72.3 | 95.1 | 95.8 | 97.2 | 96.9 | 99.85 |
|  | performanfce retention rate [%] | 20.2 | 35.9 | 83.5 | 90.4 | 94.8 | 95.2 | 94.1 |

TABLE 1-2

|  |  | Example 1-8 | Example 1-9 | Example 1-10 | Example 1-11 | Example 1-12 | Example 1-13 | Example 1-14 |
|---|---|---|---|---|---|---|---|---|
|  | carrier | PP | PP | PP | PP | PP | PP | PP |
|  | process method | vavor deposition | vavor deposition | vavor deposition | vavor deposition | vavor deposition | vavor deposition | vavor deposition |
|  | polytetrafluoroetylene | n-$C_{10}F_{22}$ | n-$C_{12}F_{26}$ | n-$C_{14}F_{30}$ | n-$C_{16}F_{34}$ | n-$C_{20}F_{42}$ | Cefral Lube V | Cefral Lube V |
|  | deposition amount [g/m$^2$] | 0.75 | 0.75 | 0.75 | 0.75 | 0.75 | 0.75 | 0.75 |
|  | melting point [° C.] | 36 | 76 | 103 | 125 | 167 | 100-290 | 100-290 |
|  | charging method | corona discharge | corona discharge | corona discharge | corona discharge | corona discharge | corona discharge | liquid contact |
| testing oil repellency | oil repellency [mN/m] | 25.4 | 25.4 | 25.4 | 25.4 | 25.4 | 25.4 | 25.4 |
|  | AATCC118 [grade] | 7 | 7 | 6 | 6 | 6 | 6 | 6 |
|  | PAO penetrative resistance | ○ | ○ | ○ | ○ | ○ | ○ | ○ |
| oil mist resistance test | tabacoo smoke durability life [mg/sheet] | 34.7 | 34.2 | 33.9 | 32.6 | 31.3 | 32.1 | 42.2 |
|  | PAO durability life [mg/sheet] | 27.4 | 26.9 | 26.5 | 25.6 | 24.3 | 24.8 | 32.5 |

TABLE 1-2-continued

|  |  | Example 1-8 | Example 1-9 | Example 1-10 | Example 1-11 | Example 1-12 | Example 1-13 | Example 1-14 |
|---|---|---|---|---|---|---|---|---|
| collective efficiency test | efficiency after charging [%] | 96.8 | 97.6 | 97.8 | 98.1 | 98.4 | 98.5 | 99.94 |
|  | efficiency with no charge [%] | 31.6 | 32.1 | 32.6 | 31.5 | 32.4 | 32.9 | 32.6 |
|  | performanfce increase [%] | 906.3 | 963.4 | 967.4 | 1047.6 | 1056.1 | 1052.6 | 1880.4 |
|  | efficiency after charging [%] | 97.0 | 98.1 | 97.9 | 97.9 | 98.2 | 98.5 | 99.93 |
|  | efficiency after heating [%] | 55.4 | 85.8 | 96.7 | 97.3 | 97.8 | 98.2 | 99.90 |
|  | performanfce retention rate [%] | 23.0 | 49.2 | 88.3 | 93.5 | 95.0 | 95.7 | 95.1 |

TABLE 1-3

|  |  | Comparative Example 1-1 | Comparative Example 1-2 | Comparative Example 1-3 | Comparative Example 1-4 | Comparative Example 1-5 |
|---|---|---|---|---|---|---|
|  | carrier | PP | PP | PP | PP | PP |
|  | process method | non-processed | solution | vavor deposition | deposition | deposition |
|  | polytetrafluoroetylene | — | Lubron L-2 | Lubron L-2 | TG-5502 | TG-5503 |
|  | deposition amount [g/m²] | 0 | 0 | 0 | 1.02 | 0.27 |
|  | melting point [° C.] | — | 330 | 330 | — | — |
|  | charging method | corona discharge | corona discharge | corona discharge | corona discharge | corona discharge |
| testing oil repellency | oil repellency [mN/m] | 38.0 | 38.0 | 38.0 | 27.0 | 35.0 |
|  | AATCC118 [grade] | 0 | 0 | 0 | 4 | 0 |
|  | PAO penetrative resistance | X | X | X | ○ | X |
| oil mist resistance test | tabacoo smole durability life [mg/sheet] | 8.1 | 8.0 | 7.8 | unexecuted | 2.3 |
|  | PAO durability life [mg/sheet] | 9.8 | 7.1 | 8.2 | unexecuted | 2.5 |
| collective efficiency test | efficiency after charging [%] | 97.4 | 97.2 | 97.2 | 32.6 | 62.1 |
|  | efficiency with no charge [%] | 30.4 | 30.1 | 30.2 | 31.7 | 30.9 |
|  | performanfce increase [%] | 1007.1 | 998.5 | 994.5 | 103.5 | 262.5 |
|  | efficiency after charging [%] | 97.2 | 97.3 | 96.9 | 32.3 | 60.8 |
|  | efficiency after heating [%] | 96.5 | 96.4 | 96.1 | 29.8 | 31.8 |
|  | performanfce retention rate [%] | 93.8 | 92.0 | 93.4 | 90.7 | 40.9 |

It was found that the durability characteristics to PAO and tobacco smoke are improved by deposition processing of polytetrafluoroethylene according to Examples 1-1 to 1-14 and Comparative Example 1-1.

Polytetrafluoroethylene was found to be preferable in either alone or in form of a mixture according to Examples 1-1 to 1-14.

Polytetrafluoroethylene having a melting point of 330° C. was found to have no effect according to comparison of Examples 1-6, 1-7, 1-13, and 1-14 with Comparative Examples 1-2 and 1-3.

Electretization by the liquid contact method was found to be more effective in high efficiency and life extension than electretization by the corona discharge according to comparison of Example 1-6 with Example 1-7 and comparison of Example 1-13 with Example 1-14.

The electret of the present invention was found to be excellent in the initial efficiency, electric charge stability, and durability as compared with the electret for which the acrylate-based water-repelling and oil-repelling agent was used, according to comparison of Examples 1-1 to 1-14 and Comparative Example 1-1 with Comparative Examples 1-4 and 1-5.

Examples 2-1 to 2-15

Polytetrafluoroethylene of n-$C_{10}F_{22}$, n-$C_{12}F_{26}$, n-$C_{14}F_{30}$, n-$C_{16}F_{34}$, and n-$C_{20}F_{42}$ dissolved in perfluoroheptane was made to infiltrate into melt-blown polypropylene nonwoven fabrics (having a basis weight (weight per unit area) of 30 g/m², an average fiber diameter of 3 μm, and a thickness of 0.25 mm) containing 0.01, 5, or 15 wt. % of CHIMASSORB 944LD manufactured by Ciba-Geigy, a hindered amine-based additive, and then the fabrics were dried at normal temperature to give processed sheets each having a deposition amount of 0.75 g/m².

The obtained sheets were subjected to an oil repellency test using liquid droplets. Further, each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm ϕ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 2-1 and Table 2-2.

Examples 2-16 to 2-18

Treatments and various kinds of evaluations were carried out in the same manner as those in Examples 2-1 to 2-15, except that Cefral Lube V manufactured by Central Glass Co., Ltd. as polytetrafluoroethylene having a melting point in a range of 100° C. to 280° C. was dissolved in perfluoroheptane. The results are shown in Tables 2-1 and 2-2.

Examples 2-19 to 2-33

Melt-blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of CHIMASSORB 944LD manufactured by Ciba-Geigy, a hindered amine-based additive, were stuck to a thermostat plate kept at 30° C. and placed on the ceiling of a reaction container made of cylindrical ceramic. A hot plate heated to 300° C. was placed on the bottom part and polytetrafluoroethylene of n-C$_{10}$F$_{22}$, n-C$_{12}$F$_{26}$, n-C$_{14}$F$_{30}$, n-C$_{16}$F$_{34}$, and n-C$_{20}$F$_{42}$ was transpired each from a metal board to give processed sheets each having a deposition amount of 0.75 g/m$^2$.

The obtained sheets were subjected to an oil repellency test using liquid droplets. Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm ϕ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 2-3 and Table 2-4.

Examples 2-34 to 2-36

Treatments and various kinds of evaluations were carried out in the same manner as those in Examples 2-19 to 2-33, except that Cefral Lube V manufactured by Central Glass Co., Ltd. was used as polytetrafluoroethylene having a melting point in a range of 100° C. to 280° C. The results are shown in Table 2-4.

Comparative Example 2-1

A melt-blown polypropylene nonwoven fabric (having a basis weight (weight per unit area) of 30 g/m$^2$, an average fiber diameter of 3 μm, and a thickness of 0.25 mm) containing no additive was put on a mesh-like support (96 meshes) having a ventilation degree of 120 cm$^3$/cm$^2$/sec and subjected to a water jetting treatment at a pressure of 2 MPa from a nozzle having a diameter of 0.1 mm ϕ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

The obtained sheet was subjected to various kinds of evaluations. The results are shown in Table 2-5.

Comparative Examples 2-2 to 2-5

Treatments and various kinds of evaluations were carried out in the same manner as those in Comparative Example 2-1, except that melt-blown polypropylene nonwoven fabrics containing 0.01, 5, 15, or 20 wt. % of CHIMASSORB 944LD manufactured by Ciba-Geigy, a hindered amine-based additive, were used. The results are shown in Table 2-5.

Comparative Examples 2-6 to 2-8

Lubron L-2 manufactured by Daikin Industries, Ltd. and having a melting point of 330° C. was dispersed in perfluoroheptane and the supernatant portion was used for deposition to melt blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of CHIMASSORB 944LD manufactured by Ciba-Geigy, a hindered amine-based additive, but no solid matter was obtained. After the perfluorohexane treatment, drying was carried out to give sheets.

The obtained sheets were subjected to an oil repellency test using liquid droplets. Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm ϕ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

The obtained sheet was subjected to various kinds of evaluations. The results are shown in Table 2-5.

Comparative Examples 2-9 to 2-11

Treatments were carried out in the same manner as those in Examples 2-19 to 2-33, except that Lubron L-2 manufactured by Daikin Industries, Ltd. and having a melting point of 330° C. was used, but no weight increase was observed.

The obtained sheets were subjected to an oil repellency test using liquid droplets. Further, each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

The obtained sheet was subjected to various kinds of evaluations. The results are shown in Table 2-6.

Comparative Examples 2-12 to 2-14

Unidyne TG-5503 manufactured by Daikin Industries, Ltd., a $C_6$ acrylate-based water-repelling and oil-repelling agent, in form of a water dispersion was used for penetrating melt-blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of CHIMASSORB 944LD manufactured by Ciba-Geigy, a hindered amine-based additive, and dried to deposit in an amount of 0.95 g/m$^2$, whereby processed sheets were obtained.

The obtained sheets were subjected to an oil repellency test using liquid droplets. Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

The obtained sheet was subjected to various kinds of evaluations. The results are shown in Table 2-6.

TABLE 2-1

|  |  | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|
|  | carrier | PP | PP | PP | PP | PP | PP | PP | PP | PP |
|  | CHIMASSORB 944 content [weight %] | 0.01 | 5 | 15 | 0.01 | 5 | 15 | 0.01 | 5 | 15 |
|  | process method | solution | solution | solution | solution | solution | solution | solution | solution | solution |
|  | polytetrafluoroetylene | n-$C_{10}F_{22}$ | n-$C_{10}F_{22}$ | n-$C_{10}F_{22}$ | n-$C_{12}F_{26}$ | n-$C_{12}F_{26}$ | n-$C_{12}F_{26}$ | n-$C_{14}F_{30}$ | n-$C_{14}F_{30}$ | n-$C_{14}F_{30}$ |
|  | deposition amount [g/m$^2$] | 0.75 | 0.75 | 0.75 | 0.75 | 0.75 | 0.75 | 0.75 | 0.75 | 0.75 |
|  | melting point [° C.] | 36 | 36 | 36 | 36 | 36 | 36 | 103 | 103 | 103 |
|  | charging method | liquid contact | liquid contact | liquid contact | liquid contact | liquid contact | liquid contact | liquid contact | liquid contact | liquid contact |
| testing oil repellency | JIS K6768 method [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 6 | 6 | 6 | 6 | 6 | 6 |
|  | PAO method | ◯ | ◯ | ◯ | ◯ | ◯ | ◯ | ◯ | ◯ | ◯ |
| oil mist resistance test | tabacoo smoke durability life [mg/sheet] | 35.2 | 39.5 | 41.1 | 34.5 | 38.5 | 40.2 | 34 | 37.9 | 39.5 |
|  | PAO durability life [mg/sheet] | 27.1 | 31.1 | 32.1 | 26.5 | 30.5 | 31.2 | 26 | 29.9 | 30.7 |
| collective efficiency test | efficiency after charging [%] | 98.00 | 99.92 | 99.97 | 98.10 | 99.91 | 99.96 | 98.20 | 99.92 | 99.97 |
|  | efficiency with no charge [%] | 32.2 | 31.2 | 31.5 | 30.3 | 32.1 | 32.0 | 30.5 | 31.2 | 29.9 |
|  | performanfce increase [%] | 1007 | 1907 | 2144 | 1098 | 1812 | 2029 | 1104 | 1907 | 2283 |

TABLE 2-2

|  |  | Example 2-10 | Example 2-11 | Example 2-12 | Example 2-13 | Example 2-14 | Example 2-15 | Example 2-16 | Example 2-17 | Example 2-18 |
|---|---|---|---|---|---|---|---|---|---|---|
|  | carrier | PP | PP | PP | PP | PP | PP | PP | PP | PP |
|  | CHIMASSORB 944 content [weight %] | 0.01 | 5 | 15 | 0.01 | 5 | 15 | 0.01 | 5 | 15 |
|  | process method | solution | solution | solution | solution | solution | solution | solution | solution | solution |
|  | polytetrafluoroetylene | n-$C_{16}F_{34}$ | n-$C_{16}F_{34}$ | n-$C_{16}F_{34}$ | n-$C_{20}F_{42}$ | n-$C_{20}F_{42}$ | n-$C_{20}F_{42}$ | Cefral Lube V | Cefral Lube V | Cefral Lube V |
|  | deposition amount [g/m$^2$] | 0.75 | 0.75 | 0.75 | 0.75 | 0.75 | 0.75 | 0.75 | 0.75 | 0.75 |
|  | melting point [° C.] | 125 | 125 | 125 | 167 | 167 | 167 | 100-290 | 100-290 | 100-290 |
|  | charging method | liquid contact | liquid contact | liquid contact | liquid contact | liquid contact | liquid contact | liquid contact | liquid contact | liquid contact |
| testing oil repellency | JIS K6768 method [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 5 | 5 | 5 | 5 | 5 | 5 |
|  | PAO method | ○ | ○ | ○ | ○ | ○ | ○ | ○ | ○ | ○ |
| oil mist resistance test | tabacoo smoke durability life [mg/sheet] | 33.2 | 37.5 | 38.4 | 32.3 | 36.9 | 38 | 33.4 | 38 | 39.1 |
|  | PAO durability life [mg/sheet] | 25.6 | 29.6 | 30.1 | 25.2 | 28.9 | 29.4 | 25.9 | 30.1 | 30.6 |
| collective efficiency test | efficiency after charging [%] | 98.10 | 99.91 | 99.98 | 98.30 | 99.92 | 99.97 | 98.30 | 99.92 | 99.97 |
|  | efficiency with no charge [%] | 31.0 | 30.2 | 30.5 | 31.8 | 31.2 | 32.0 | 31.8 | 31.2 | 32.0 |
|  | performanfce increase [%] | 1068 | 1951 | 2341 | 1065 | 1907 | 2103 | 1065 | 1907 | 2103 |

TABLE 2-3

|  |  | Example 2-19 | Example 2-20 | Example 2-21 | Example 2-22 | Example 2-23 | Example 2-24 | Example 2-25 | Example 2-26 | Example 2-27 |
|---|---|---|---|---|---|---|---|---|---|---|
|  | carrier | PP | PP | PP | PP | PP | PP | PP | PP | PP |
|  | CHIMASSORB 944 content [weight %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | n-$C_{10}F_{22}$ | n-$C_{10}F_{22}$ | n-$C_{10}F_{22}$ | n-$C_{12}F_{26}$ | n-$C_{12}F_{26}$ | n-$C_{12}F_{26}$ | n-$C_{14}F_{30}$ | n-$C_{14}F_{30}$ | n-$C_{14}F_{30}$ |
|  | deposition amount [g/m$^2$] | 0.75 | 0.75 | 0.75 | 0.75 | 0.75 | 0.75 | 0.75 | 0.75 | 0.75 |
|  | melting point [° C.] | 36 | 36 | 36 | 76 | 76 | 76 | 103 | 103 | 103 |
|  | charging method | liquid contact | liquid contact | liquid contact | liquid contact | liquid contact | liquid contact | liquid contact | liquid contact | liquid contact |
| testing oil repellency | JIS K6768 method [mN/m] | 25.4 | 25.4 | 25.4 | 25.4 | 25.4 | 25.4 | 25.4 | 25.4 | 25.4 |
|  | AATCC118 method [grade] | 7 | 7 | 7 | 7 | 7 | 7 | 6 | 6 | 6 |
|  | PAO method | ○ | ○ | ○ | ○ | ○ | ○ | ○ | ○ | ○ |
| oil mist resistance test | tabacoo smoke durability life [mg/sheet] | 36.3 | 40.5 | 42.9 | 35.2 | 39.6 | 41.6 | 34.1 | 38.2 | 40.4 |
|  | PAO durability life [mg/sheet] | 28 | 32.6 | 33.8 | 27.1 | 31.7 | 32.5 | 26 | 30.5 | 31.3 |
| collective efficiency test | efficiency after charging [%] | 98.30 | 99.93 | 99.98 | 97.90 | 99.94 | 99.97 | 98.10 | 99.92 | 99.98 |
|  | efficiency with no charge [%] | 30.1 | 29.9 | 31.1 | 31.2 | 32.1 | 31.1 | 32.6 | 32.1 | 30.1 |
|  | performanfce increase [%] | 1138 | 2045 | 2286 | 1033 | 1916 | 2178 | 1005 | 1842 | 2378 |

TABLE 2-4

|  |  | Example 2-28 | Example 2-29 | Example 2-30 | Example 2-31 | Example 2-32 | Example 2-33 | Example 2-34 | Example 2-35 | Example 2-36 |
|---|---|---|---|---|---|---|---|---|---|---|
|  | carrier | PP | PP | PP | PP | PP | PP | PP | PP | PP |
|  | CHIMASSORB 944 content [weight %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | $n\text{-}C_{16}F_{34}$ | $n\text{-}C_{16}F_{34}$ | $n\text{-}C_{16}F_{34}$ | $n\text{-}C_{20}F_{42}$ | $n\text{-}C_{20}F_{42}$ | $n\text{-}C_{20}F_{42}$ | Cefral Lube V | Cefral Lube V | Cefral Lube V |
|  | deposition amount [g/m$^2$] | 0.75 | 0.75 | 0.75 | 0.75 | 0.75 | 0.75 | 0.75 | 0.75 | 0.75 |
|  | melting point [° C.] | 125 | 125 | 125 | 167 | 167 | 167 | 100-290 | 100-290 | 100-290 |
|  | charging method | liquid contact | liquid contact | liquid contact | liquid contact | liquid contact | liquid contact | liquid contact | liquid contact | liquid contact |
| testing oil repellency | JIS K6768 method [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 6 | 6 | 6 | 6 | 6 | 6 |
|  | PAO method | ○ | ○ | ○ | ○ | ○ | ○ | ○ | ○ | ○ |
| oil mist resistance test | tabacoo smoke durability life [mg/sheet] | 32.9 | 37.1 | 39.3 | 32 | 36.6 | 38.2 | 32.5 | 36.2 | 37.4 |
|  | PAO durability life [mg/sheet] | 25.1 | 29.6 | 30.4 | 24.5 | 29.1 | 29.6 | 24.8 | 28.4 | 29.1 |
| collective efficiency test | efficiency after charging [%] | 98.10 | 99.91 | 99.98 | 98.70 | 99.93 | 99.96 | 98.20 | 99.91 | 99.98 |
|  | efficiency with no charge [%] | 31.5 | 30.3 | 29.7 | 32.4 | 31.1 | 30.4 | 32.9 | 30.2 | 30.5 |
|  | performanfce increase [%] | 1048 | 1943 | 2417 | 1109 | 1950 | 2159 | 1007 | 1951 | 2341 |

TABLE 2-5

|  |  | Comparative Example 2-1 | Comparative Example 2-2 | Comparative Example 2-3 | Comparative Example 2-4 | Comparative Example 2-5 | Comparative Example 2-6 | Comparative Example 2-7 | Comparative Example 2-8 |
|---|---|---|---|---|---|---|---|---|---|
|  | carrier | PP | PP | PP | PP | PP | PP | PP | PP |
|  | CHIMASSORB 944 content [weight %] | — | 0.01 | 5 | 15 | 20 | 0.01 | 5 | 15 |
|  | process method | non-proceeded | non-processed | non-processed | non-processed | non-processed | solution | solution | solution |
|  | polytetrafluoroetylene | — | — | — | — | — | Lubron L-2 | Lubron L-2 | Lubron L-2 |
|  | deposition amount [g/m$^2$] | 0 | 0 | 0 | 0 | 0 | 0 | 0 | 0 |
|  | meting point [° C.] | — | — | — | — | — | 330 | 330 | 330 |
|  | charging method | liquid contact | liquid contact | liquid contact | liquid contact | liquid contact | liquid contact | liquid contact | liquid contact |
| testing oil repellency | JIS K6768 method [mN/m] | 38.0 | 38.0 | 38.0 | 39.0 | 40.0 | 38.0 | 33.0 | 38.0 |
|  | AATCC118 method [grade] | 0 | 0 | 0 | 0 | 0 | 0 | 0 | 0 |
|  | PAO method | X | X | X | X | X | X | X | X |
| oil mist resistance test | tabacoo smoke durability life [mg/sheet] | 8.2 | 8.9 | 9.3 | 10.0 | 7.3 | 8.4 | 8.1 | 8.6 |
|  | PAO durabilhy life [mg/sheet] | 9.7 | 10.1 | 10.9 | 11.4 | 9.2 | 9.8 | 9.6 | 9.4 |
| collective efficiency test | efficiency after charging [%] | 97.10 | 98.30 | 99.92 | 99.98 | 99.95 | 97.20 | 99.92 | 99.97 |
|  | efficiency with no charge [%] | 30.2 | 29.9 | 31.1 | 30.5 | 30.1 | 31.1 | 32.1 | 32.5 |
|  | performanfce increase [%] | 985 | 1147 | 1914 | 2341 | 2123 | 960 | 1842 | 2064 |

TABLE 2-6

| | | Comparative Example 2-9 | Comparative Example 2-10 | Comparative Example 2-11 | Comparative Example 2-12 | Comparative Example 2-13 | Comparative Example 2-14 |
|---|---|---|---|---|---|---|---|
| carrier | | PP | PP | PP | PP | PP | PP |
| CHIMASSORB 944 content [weight %] | | 0.01 | 5 | 15 | 0.01 | 5 | 15 |
| process method | | vavor deposition | vavor deposition | vavor deposition | deposition | deposition | deposition |
| polytetrafluoroetylene | | Lubron L-2 | Lubron L-2 | Lubron L-2 | TG-5503 | TG-5503 | TG-5503 |
| deposition amount [g/m$^2$] | | 0 | 0 | 0 | 0.95 | 0.95 | 0.95 |
| melting point [° C.] | | 330 | 330 | 330 | — | — | — |
| charging method | | liquid contact | liquid contact | liquid contact | liquid contact | liquid contact | liquid contact |
| testing oil repellency | JIS K6768 method [mN/m] | 38.0 | 38.0 | 38.0 | 38.0 | 38.0 | 38.0 |
| | AATCC118 method [grade] | 0 | 0 | 0 | 0 | 0 | 0 |
| | PAO method | X | X | X | X | X | X |
| oil mist resistance test | tabacoo smoke durability life [mg/sheet] | 8.5 | 9.3 | 9.8 | 2.4 | 2.9 | 2.6 |
| | PAO durability life [mg/sheet] | 9.4 | 10 | 10.8 | 2.8 | 3.2 | 2.7 |
| collective efficiency test | efficiency after charging [%] | 98.10 | 99.93 | 99.98 | 49.10 | 51.20 | 48.80 |
| | efficiency with no charge [%] | 29.8 | 33.1 | 34.0 | 30.1 | 32.2 | 31.2 |
| | performanfce increase [%] | 1120 | 1807 | 2050 | 189 | 185 | 179 |

Examples 3-1 to 3-15

Polytetrafluoroethylene of n-$C_{10}F_{22}$, n-$C_{12}F_{26}$, n-$C_{14}F_{30}$, n-$C_{16}F_{34}$, and n-$C_{20}F_{42}$ dissolved in perfluoroheptane was made to infiltrate into melt-blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of Irganox 1010 manufactured by BASF, a hindered phenol-based additive, and then the fabrics were dried at normal temperature to give processed sheets each having a deposition amount of 0.75 g/m$^2$.

Each of the obtained sheets was put on an earth electrode of an aluminum flat plate and subjected to a corona charging treatment at a voltage of 20 kV for 10 seconds using a needle-like electrode at a distance of 1 cm from the nonwoven fabric to give an electretized sheet.

Each of the obtained sheets was subjected to various kinds of evaluations. The results are shown in Table 3-1 and Table 3-2.

Examples 3-16 to 3-18

Treatments were carried out in the same manner as those in Examples 3-1 to 3-15, except that Cefral Lube V manufactured by Central Glass Co., Ltd. as polytetrafluoroethylene having a melting point in a range of 100° C. to 280° C. was dissolved in perfluoroheptane, to give electretized sheets.

Each of the obtained sheets was subjected to various kinds of evaluations. The results are shown in Table 3-2.

Examples 319 to 3-33

Melt-blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of Irganox 1010 manufactured by BASF, a hindered phenol-based additive, were stuck to a thermostat plate kept at 30° C. and placed on the ceiling of a reaction container made of cylindrical ceramic. A hot plate heated to 300° C. was placed on the bottom part and polytetrafluoroethylene of n-$C_{10}F_{22}$, n-$C_{12}F_{26}$, n-$C_{14}F_{30}$, n-$C_{16}F_{34}$, and n-$C_{20}F_{42}$ was transpired each from a metal board to give processed sheets each having a deposition amount of 0.75 g/m$^2$.

Each of the obtained sheets was put on an earth electrode of an aluminum flat plate and subjected to a corona charging treatment at a voltage of 20 kV for 10 seconds using a needle-like electrode at a distance of 1 cm from the nonwoven fabric to give an electretized sheet.

Each of the obtained sheets was subjected to various kinds of evaluations. The results are shown in Table 3-3 and Table 3-4.

Examples 3-34 to 3-36

Treatments were carried out in the same manner as those in Examples 3-19 to 3-33, except that Cefral Lube V manufactured by Central Glass Co., Ltd. was used as polytetrafluoroethylene having a melting point in a range of 100° C. to 280° C., to give electretized sheets.

Each of the obtained sheets was subjected to various kinds of evaluations. The results are shown in Table 3-4.

Comparative Example 3-1

Melt-blown polypropylene nonwoven fabrics (having a basis weight (weight per unit area) of 30 g/m$^2$, an average fiber diameter of 3 μm, and a thickness of 0.25 mm) containing no additive were put on an earth electrode of an aluminum flat plate and subjected to a corona charging treatment at a voltage of 20 kV for 10 seconds using a needle-like electrode at a distance of 1 cm from the nonwoven fabrics to give electretized sheets.

Each of the obtained sheets was subjected to various kinds of evaluations. The results are shown in Table 3-5.

Comparative Examples 3-2 to 3-5

Treatments were carried out in the same manner as those in Comparative Example 1, except that melt-blown polypropylene nonwoven fabrics containing 0.01, 5, 15, or 20 wt. % of Irganox 1010 manufactured by BASF, a hindered phenol-based additive, were used to give electretized sheets.

Each of the obtained sheets was subjected to various kinds of evaluations. The results are shown in Table 3-5.

Comparative Examples 3-6 to 3-8

Lubron L-2 manufactured by Daikin Industries, Ltd. and having a melting point of 330° C. was dispersed in perfluoroheptane and the supernatant portion was used for deposition to melt blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of Irganox 1010 manufactured by BASF, a hindered phenol-based additive, but no solid matter was obtained. After the perfluorohexane treatment, drying was carried out to give sheets.

Each of the obtained sheets was put on an earth electrode of an aluminum flat plate and subjected to a corona charging treatment at a voltage of 20 kV for 10 seconds using a needle-like electrode at a distance of 1 cm from the nonwoven fabric to give an electretized sheet.

Each of the obtained sheets was subjected to various kinds of evaluations. The results are shown in Table 3-5.

Comparative Examples 3-9 to 3-11

Treatments were carried out in the same manner as those in Examples 3-19 to 3-33, except that Lubron L-2 manufactured by Daikin Industries, Ltd. and having a melting point of 330° C. was used, but no weight increase was observed.

The obtained sheets were subjected to an oil repellency test using liquid droplets. Further, each of the obtained sheets was put on an earth electrode of an aluminum flat plate and subjected to a corona charging treatment at a voltage of 20 kV for 10 seconds using a needle-like electrode at a distance of 1 cm from the nonwoven fabric to give an electretized sheet.

Each of the obtained sheets was subjected to various kinds of evaluations. The results are shown in Table 3-6.

Comparative Examples 3-12 to 3-14

Unidyne TG-5503 manufactured by Daikin Industries, Ltd., a $C_6$ acrylate-based water-repelling and oil-repelling agent, in form of a water dispersion was used for penetrating melt-blown polypropylene nonwoven fabrics (having a basis weight (weight per unit area) of 30 g/m$^2$, an average fiber diameter of 3 μm, and a thickness of 0.25 mm) containing 0.01, 5, or 15 wt. % of Irganox 1010 manufactured by BASF, a hindered phenol-based additive, and dried to deposit in an amount of 0.95 g/m$^2$, whereby processed sheets were obtained.

Each of the obtained sheets was put on an earth electrode of an aluminum flat plate and subjected to a corona charging treatment at a voltage of 20 kV for 10 seconds using a needle-like electrode at a distance of 1 cm from the nonwoven fabric to give an electretized sheet.

Each of the obtained sheets was subjected to various kinds of evaluations. The results are shown in Table 3-6.

Examples 3-37 to 3-51

Polytetrafluoroethylene of n-$C_{10}F_{22}$, n-$C_{12}F_{26}$, n-$C_{14}F_{30}$, n-$C_{16}F_{34}$, and n-$C_{20}F_{42}$ dissolved in perfluoroheptane was made to infiltrate into melt-blown polypropylene nonwoven fabrics (having a basis weight (weight per unit area) of 30 g/m$^2$, an average fiber diameter of 3 μm, and a thickness of 0.25 mm) containing 0.01, 5, or 12.5 wt. % of Irganox 1010 manufactured by BASF, a hindered phenol-based additive, and then the fabrics were dried at normal temperature to give processed sheets each having a deposition amount of 0.75 g/m$^2$.

Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 3-7 and Table 3-8.

Examples 3-52 to 3-54

Treatments and various kinds of evaluations were carried out in the same manner as those in Examples 3-37 to 3-51, except that Cefral Lube V manufactured by Central Glass Co., Ltd. as polytetrafluoroethylene having a melting point in a range of 100° C. to 280° C. was dissolved in perfluoroheptane. The results are shown in Table 3-8.

Examples 3-55 to 3-69

Melt-blown polypropylene nonwoven fabrics (having a basis weight (weight per unit area) of 30 g/m$^2$, an average fiber diameter of 3 μm, and a thickness of 0.25 mm) containing 0.01, 5, or 12.5 wt. % of Irganox 1010 manufactured by BASF, a hindered phenol-based additive, were stuck to a thermostat plate kept at 30° C. and placed on the ceiling of a reaction container made of cylindrical ceramic. A hot plate heated to 300° C. was placed on the bottom part and polytetrafluoroethylene of n-$C_{10}F_{22}$, n-$C_{42}F_{26}$, n-$C_{44}F_{30}$, n-$C_{46}F_{34}$, and n-$C_{20}F_{42}$ was transpired each from a metal board to give processed sheets each having a deposition amount of 0.75 g/m$^2$.

Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 3-9 and Table 3-10.

Examples 3-70 to 3-72

Treatments and various kinds of evaluations were carried out in the same manner as those in Examples 3-55 to 3-69, except that Cefral Lube V manufactured by Central Glass Co., Ltd. was used as polytetrafluoroethylene having a melting point in a range of 100° C. to 280° C. The results are shown in Table 3-10.

Comparative Example 3-15

A melt-blown polypropylene nonwoven fabric (having a basis weight (weight per unit area) of 30 g/m$^2$, an average fiber diameter of 3 μm, and a thickness of 0.25 mm) containing no additive was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet. Each of the obtained sheets was subjected to various kinds of evaluations. The results are shown in Table 3-11.

Comparative Examples 3-16 to 3-19

Treatments and various kinds of evaluations were carried out in the same manner as those in Comparative Example 3-15, except that melt-blown polypropylene nonwoven fabrics containing 0.01, 5, 12.5, or 20 wt. % of Irganox 1010 manufactured by BASF, a hindered phenol-based additive, were used. The results are shown in Table 3-11.

Comparative Example 3-20

Treatments and various kinds of evaluations were carried out in the same manner as those in Example 3-37, except that Cefral Lube V manufactured by Central Glass Co., Ltd. as polytetrafluoroethylene having a melting point in a range of 100° C. to 280° C. was dissolved in perfluoroheptane for melt-blown polypropylene nonwoven fabrics (having a basis weight (weight per unit area) of 30 g/m$^2$, an average fiber diameter of 3 μm, and a thickness of 0.25 mm) containing 20 wt. % of Irganox 1010 manufactured by BASF, a hindered phenol-based additive. The results are shown in Table 3-11.

Comparative Example 3-21

Treatments and various kinds of evaluations were carried out in the same manner as those in Example 3-55, except that Cefral Lube V manufactured by Central Glass Co., Ltd. as polytetrafluoroethylene having a melting point in a range of 100° C. to 280° C. was transpired in perfluoroheptane by the same treatment as that in Example 3-55 for melt-blown polypropylene nonwoven fabrics (having a basis weight (weight per unit area) of 30 g/m$^2$, an average fiber diameter of 3 μm, and a thickness of 0.25 mm) containing 20 wt. % of Irganox 1010 manufactured by BASF, a hindered phenol-based additive. The results are shown in Table 3-11.

Comparative Examples 3-22 to 3-24

Lubron L-2 manufactured by Daikin Industries, Ltd. and having a melting point of 330° C. was dispersed in perfluoroheptane and the supernatant portion was used for deposition to melt blown polypropylene nonwoven fabrics (having a basis weight (weight per unit area) of 30 g/m$^2$, an average fiber diameter of 3 μm, and a thickness of 0.25 mm) containing 0.01, 5, or 12.5 wt. % of Irganox 1010 manufactured by BASF, a hindered phenol-based additive, but no solid matter was obtained. After the perfluorohexane treatment, drying was carried out to give sheets.

Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 3-12.

Comparative Examples 3-25 to 3-27

Treatments were carried out in the same manner as those in Examples 3-55 to 69, except that Lubron L-2 manufactured by Daikin Industries, Ltd. and having a melting point of 330° C. was used, but no weight increase was observed.

Each of the obtained sheets was put on a mesh-like support (96 meshes) having a ventilation degree of 120 cm$^3$/cm$^2$/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 3-12.

Comparative Examples 3-28 to 3-30

Unidyne TG-5503 manufactured by Daikin Industries, Ltd., a C$_6$ acrylate-based water-repelling and oil-repelling agent, in form of a water dispersion was used for penetrating melt-blown polypropylene nonwoven fabrics (having a basis weight (weight per unit area) of 30 g/m², an average fiber diameter of 3 μm, and a thickness of 0.25 mm) containing 0.01, 5, or 12.5 wt. % of Irganox 1010 manufactured by BASF, a hindered phenol-based additive, and dried to deposit in an amount of 0.95 g/m², whereby processed sheets were obtained.

Each of the obtained sheets was put on a mesh-like support (96 meshes) having a ventilation degree of 120 cm³/cm²/sec and subjected to a water jetting treatment at a pressure of 2 MPa from a nozzle having a diameter of 0.1 mm φ and pitches of 0.6 mm and installed 3 cm above the nonwoven fabric. Additionally, the water used was highly pure water obtained by a two-stage reverse osmosis membrane treatment of common tap water and a subsequent ion-exchange membrane treatment. The transportation speed of the support was set to be 3 m/min, and the pressure under the mesh body immediately under the nozzle was kept at a reduced pressure of 600 mmAq. The treatment was carried out three times for the surface of each sheet. Thereafter, the sheet was spontaneously dried or held in a hot air oven at 80° C. for 1 minute to give an electretized sheet.

Each of the obtained sheets was subjected to various kinds of evaluations. The results are shown in Table 3-12.

TABLE 3-1

| | | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|---|
| | carrier | PP | PP | PP | PP | PP | PP | PP | PP | PP |
| | Irganox1010 content [wt %] | 0.01 | 5 | 15 | 0.01 | 5 | 15 | 0.01 | 5 | 15 |
| | process method | solution | solution | solution | solution | solution | solution | solution | solution | solution |
| | polytetrafluoroetylene | $n\text{-}C_{10}F_{22}$ | $n\text{-}C_{10}F_{22}$ | $n\text{-}C_{10}F_{22}$ | $n\text{-}C_{12}F_{25}$ | $n\text{-}C_{12}F_{25}$ | $n\text{-}C_{12}F_{25}$ | $n\text{-}C_{14}F_{30}$ | $n\text{-}C_{14}F_{30}$ | $n\text{-}C_{14}F_{30}$ |
| | deposition amount [g/m²] | 0.75 | 0.75 | 0.75 | 0.75 | 0.75 | 0.75 | 0.75 | 0.75 | 0.75 |
| | melting point [° C.] | 36 | 36 | 36 | 36 | 36 | 36 | 103 | 103 | 103 |
| | charging method | corona charging | corona charging | corona charging | corona charging | corona charging | corona charging | corona charging | corona charging | corona charging |
| testing oil repellency | oil repellency [mN/m] | 25.4 | 25.4 | 25.4 | 25.4 | 25.4 | 25.4 | 25.4 | 25.4 | 25.4 |
| | AATCC118 method [grade] | 6 | 6 | 6 | 6 | 6 | 6 | 6 | 6 | 6 |
| | PAO method | ◯ | ◯ | ◯ | ◯ | ◯ | ◯ | ◯ | ◯ | ◯ |
| oil mist resistance test | tabacoo smoke durability life [mg/sheet] | 35.2 | 39.5 | 41.1 | 36.1 | 39.5 | 41.5 | 35 | 39.2 | 41.2 |
| | PAO durability life [mg/sheet] | 28.2 | 32.5 | 34.0 | 27.2 | 31.3 | 32.7 | 27.5 | 31.2 | 32.7 |
| collective efficiency test | efficiency after charging [%] | 97.50 | 98.50 | 98.70 | 97.65 | 98.02 | 98.50 | 97.20 | 98.50 | 98.75 |
| | efficiency with no charge [%] | 31.2 | 32.0 | 31.5 | 30.2 | 31.5 | 31.1 | 32.0 | 33.1 | 31.3 |
| | performanfce increase [%] | 986 | 1089 | 1148 | 1043 | 1037 | 1127 | 927 | 1045 | 1167 |

TABLE 3-2

| | | Example 3-10 | Example 3-11 | Example 3-12 | Example 3-13 | Example 3-14 | Example 3-15 | Example 3-16 | Example 3-17 | Example 3-18 |
|---|---|---|---|---|---|---|---|---|---|---|
| | carrier | PP | PP | PP | PP | PP | PP | PP | PP | PP |
| | Irganox1010 content [wt %] | 0.01 | 5 | 15 | 0.01 | 5 | 15 | 0.01 | 5 | 15 |
| | process method | solution | solution | solution | solution | solution | solution | solution | solution | solution |
| | polytetrafluoroetylene | $n\text{-}C_{16}F_{34}$ | $n\text{-}C_{16}F_{34}$ | $n\text{-}C_{16}F_{34}$ | $n\text{-}C_{20}F_{42}$ | $n\text{-}C_{20}F_{42}$ | $n\text{-}C_{20}F_{42}$ | Cefral Lube V | Cefral Lube V | Cefral Lube V |
| | deposition amount [g/m²] | 0.75 | 0.75 | 0.75 | 0.75 | 0.75 | 0.75 | 0.75 | 0.75 | 0.75 |
| | melting point [° C.] | 125 | 125 | 125 | 167 | 167 | 167 | 100-290 | 100-290 | 100-290 |
| | charging method | corona charging | corona charging | corona charging | corona charging | corona charging | corona charging | corona charging | corona charging | corona charging |
| testing oil repellency | oil repellency [mN/m] | 25.4 | 25.4 | 25.4 | 25.4 | 25.4 | 25.4 | 25.4 | 25.4 | 25.4 |
| | AATCC118 method [grade] | 6 | 6 | 6 | 5 | 5 | 5 | 5 | 5 | 5 |
| | PAO method | ◯ | ◯ | ◯ | ◯ | ◯ | ◯ | ◯ | ◯ | ◯ |
| oil mist resistance test | tabacoo smoke durability life [mg/sheet] | 35.7 | 39.8 | 40.2 | 33.9 | 38.1 | 40.1 | 35.2 | 39.8 | 42.5 |
| | PAO durability life [mg/sheet] | 27.5 | 31.2 | 32.1 | 26.7 | 30.2 | 30.8 | 27.1 | 32.1 | 31.9 |
| collective efficiency test | efficiency after charging [%] | 97.70 | 98.80 | 98.79 | 97.80 | 98.50 | 98.81 | 97.20 | 98.30 | 98.80 |
| | efficiency with no charge [%] | 32.1 | 29.9 | 30.2 | 30.7 | 30.1 | 31.5 | 30.2 | 32.1 | 31.6 |

TABLE 3-2-continued

|  |  | Example 3-10 | Example 3-11 | Example 3-12 | Example 3-13 | Example 3-14 | Example 3-15 | Example 3-16 | Example 3-17 | Example 3-18 |
|---|---|---|---|---|---|---|---|---|---|---|
|  | performanfce increase [%] | 974 | 1245 | 1228 | 1041 | 1173 | 1171 | 994 | 1052 | 1165 |

TABLE 3-3

|  |  | Example 3-19 | Example 3-20 | Example 3-21 | Example 3-22 | Example 3-23 | Example 3-24 | Example 3-25 | Example 3-26 | Example 3-27 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | $n\text{-}C_{10}F_{22}$ | $n\text{-}C_{10}F_{22}$ | $n\text{-}C_{10}F_{22}$ | $n\text{-}C_{12}F_{26}$ | $n\text{-}C_{12}F_{26}$ | $n\text{-}C_{12}F_{26}$ | $n\text{-}C_{14}F_{30}$ | $n\text{-}C_{14}F_{30}$ | $n\text{-}C_{14}F_{30}$ |
|  | deposition amount [g/m²] | 0.75 | 0.75 | 0.75 | 0.75 | 0.75 | 0.75 | 0.75 | 0.75 | 0.75 |
|  | melting point [° C.] | 36 | 36 | 36 | 76 | 76 | 76 | 103 | 103 | 103 |
|  | charging method | corona charging | corona charging | corona charging | corona charging | corona charging | corona charging | corona charging | corona charging | corona charging |
| testing oil repellency | oil repellency [mN/m] | 25.4 | 25.4 | 25.4 | 25.4 | 25.4 | 25.4 | 25.4 | 25.4 | 25.4 |
|  | AATCC118 method [grade] | 7 | 7 | 7 | 7 | 7 | 7 | 6 | 6 | 6 |
|  | PAO method | ◯ | ◯ | ◯ | ◯ | ◯ | ◯ | ◯ | ◯ | ◯ |
| oil mist resistance test | tabacoo smoke durability life [mg/sheet] | 38.1 | 41.9 | 43.8 | 36.7 | 41.5 | 42.9 | 35.8 | 40.3 | 42.2 |
|  | PAO durability life [mg/sheet] | 29.7 | 34.1 | 35.8 | 28.5 | 33.2 | 33.9 | 27.9 | 32.7 | 33.1 |
| collective efficiency test | efficiency after charging [%] | 97.80 | 98.30 | 98.75 | 97.50 | 98.25 | 98.86 | 97.21 | 98.19 | 98.78 |
|  | efficiency with no charge [%] | 29.8 | 31.5 | 30.4 | 30.2 | 29.7 | 30.3 | 30.1 | 31.3 | 31.2 |
|  | performanfce increase [%] | 1079 | 1077 | 1209 | 1026 | 1148 | 1239 | 999 | 1069 | 1178 |

TABLE 3-4

|  |  | Example 3-28 | Example 3-29 | Example 3-30 | Example 3-31 | Example 3-32 | Example 3-33 | Example 3-34 | Example 3-35 | Example 3-36 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | $n\text{-}C_{16}F_{34}$ | $n\text{-}C_{16}F_{34}$ | $n\text{-}C_{16}F_{34}$ | $n\text{-}C_{20}F_{42}$ | $n\text{-}C_{20}F_{42}$ | $n\text{-}C_{20}F_{42}$ | Cefral Lube V | Cefral Lube V | Cefral Lube V |
|  | deposition amount [g/m²] | 0.75 | 0.75 | 0.75 | 0.75 | 0.75 | 0.75 | 0.75 | 0.75 | 0.75 |
|  | melting point [° C.] | 125 | 125 | 125 | 167 | 167 | 167 | 100-290 | 100-290 | 100-290 |
|  | charging method | corona charging | corona charging | corona charging | corona charging | corona charging | corona charging | corona charging | corona charging | corona charging |
| testing oil repellency | oil repellency [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 6 | 6 | 6 | 6 | 6 | 6 |
|  | PAO method | ◯ | ◯ | ◯ | ◯ | ◯ | ◯ | ◯ | ◯ | ◯ |
| oil mist resistance test | tabacoo smoke durability life [mg/sheet] | 34.2 | 39 | 41.2 | 34.1 | 39.1 | 41.1 | 34.1 | 38.9 | 39.1 |
|  | PAO durability life [mg/sheet] | 26.9 | 31.6 | 32.1 | 25.6 | 30.2 | 31.8 | 26.2 | 29.9 | 31.8 |
| collective efficiency test | efficiency after charging [%] | 97.32 | 98.27 | 98.77 | 97.20 | 98.13 | 98.91 | 97.05 | 98.18 | 98.57 |
|  | efficiency with no charge [%] | 30.7 | 31.2 | 32.8 | 32.9 | 30.1 | 31.1 | 29.7 | 31.5 | 29.9 |
|  | performanfce increase [%] | 987 | 1085 | 1106 | 896 | 1111 | 1213 | 1000 | 1059 | 1196 |

TABLE 3-5

|  |  | Comparative Example 3-1 | Comparative Example 3-2 | Comparative Example 3-3 | Comparative Example 3-4 | Comparative Example 3-5 | Comparative Example 3-6 | Comparative Example 3-7 | Comparative Example 3-8 |
|---|---|---|---|---|---|---|---|---|---|
|  | carrier | PP | PP | PP | PP | PP | PP | PP | PP |
|  | Irganox1010 content [wt %] | — | 0.01 | 5 | 15 | 20 | 0.01 | 5 | 15 |
|  | process method | non-proceeded | non-proceeded | non-proceeded | non-proceeded | non-proceeded | solution | solution | solution |
|  | polytetrafluoroetylene | — | — | — | — | — | Lubron L-2 | Lubron L-2 | Lubron L-2 |
|  | deposition amount [g/m$^2$] | 0 | 0 | 0 | 0 | 0 | 0 | 0 | 0 |
|  | melting point [° C.] | — | — | — | — | — | 330 | 330 | 330 |
|  | charging method | corona charging | corona charging | corona charging | corona charging | corona charging | corona charging | corona charging | corona charging |
| testing oil repellency | oil repellency [mN/m] | 38.0 | 38.0 | 38.0 | 39.0 | 40.0 | 38.0 | 38.0 | 38.0 |
|  | AATCC118 method [grade] | 0 | 0 | 0 | 0 | 0 | 0 | 0 | 0 |
|  | PAO method | X | X | X | X | X | X | X | X |
| oil mist resistance test | tabacoo smoke durability life [mg/sheet] | 8.2 | 9.3 | 9.7 | 10.5 | 10.2 | 8.9 | 9.2 | 9.6 |
|  | PAO durability life [mg/sheet] | 10.1 | 11.8 | 11.9 | 12.1 | 10.3 | 10.1 | 10.3 | 10.3 |
| collective efficiency test | efficiency after charging [%] | 96.50 | 97.32 | 98.31 | 98.86 | 98.85 | 97.41 | 98.29 | 98.92 |
|  | efficiency with no charge [%] | 31.3 | 30.2 | 32.8 | 30.1 | 31.1 | 30.2 | 31.1 | 32.2 |
|  | performanfce increase [%] | 893 | 1007 | 1027 | 1249 | 1199 | 1016 | 1092 | 1166 |

TABLE 3-6

|  |  | Comparative Example 3-9 | Comparative Example 3-10 | Comparative Example 3-11 | Comparative Example 3-12 | Comparative Example 3-13 | Comparative Example 3-14 |
|---|---|---|---|---|---|---|---|
|  | carrier | PP | PP | PP | PP | PP | PP |
|  | Irganox1010 content [wt %] | 0.01 | 5 | 15 | 0.01 | 5 | 15 |
|  | process method | vavor deposition | vavor deposition | vavor deposition | deposition | deposition | deposition |
|  | polytetrafluoroetylene | Lubron L-2 | Lubron L-2 | Lubron L-2 | TG-5503 | TG-5503 | TG-5503 |
|  | deposition amount [g/m$^2$] | 0 | 0 | 0 | 0.95 | 0.95 | 0.95 |
|  | melting point [° C.] | 330 | 330 | 330 | — | — | — |
|  | charging method | corona charging | corona charging | corona charging | corona charging | corona charging | corona charging |
| testing oil repellency | oil repellency [mN/m] | 38.0 | 38.0 | 38.0 | 35.0 | 35.0 | 35.0 |
|  | AATCC118 method [grade] | 0 | 0 | 0 | 0 | 0 | 0 |
|  | PAO method | X | X | X | X | X | X |
| oil mist resistance test | tabacoo smoke durability life [mg/sheet] | 8.8 | 9.7 | 10.1 | 3.1 | 3.4 | 3.6 |
|  | PAO durability life [mg/sheet] | 9.8 | 10.2 | 11.1 | 3.1 | 3.3 | 3.2 |
| collective efficiency test | efficiency after charging [%] | 97.31 | 98.26 | 98.64 | 47.70 | 49.60 | 50.10 |
|  | efficiency with no charge [%] | 31.4 | 29.6 | 30.4 | 29.8 | 29.9 | 32.1 |
|  | performanfce increase [%] | 959 | 1154 | 1186 | 183 | 193 | 180 |

TABLE 3-7

|  | Example 3-37 | Example 3-38 | Example 3-39 | Example 3-40 | Example 3-41 | Example 3-42 | Example 3-43 | Example 3-44 | Example 3-45 |
|---|---|---|---|---|---|---|---|---|---|
| carrier | PP | PP | PP | PP | PP | PP | PP | PP | PP |
| Irganox1010 content [wt %] | 0.01 | 5 | 12.5 | 0.01 | 5 | 12.5 | 0.01 | 5 | 12.5 |
| process method | solution | solution | solution | solution | solution | solution | solution | solution | solution |
| polytetrafluoroetylene | n-C$_{10}$F$_{22}$ | n-C$_{10}$F$_{22}$ | n-C$_{10}$F$_{22}$ | n-C$_{12}$F$_{26}$ | n-C$_{12}$F$_{26}$ | n-C$_{12}$F$_{26}$ | n-C$_{14}$F$_{30}$ | n-C$_{14}$F$_{30}$ | n-C$_{14}$F$_{30}$ |

TABLE 3-7-continued

|  | | Example 3-37 | Example 3-38 | Example 3-39 | Example 3-40 | Example 3-41 | Example 3-42 | Example 3-43 | Example 3-44 | Example 3-45 |
|---|---|---|---|---|---|---|---|---|---|---|
|  | deposition amount [g/m$^2$] | 0.75 | 0.75 | 0.75 | 0.75 | 0.75 | 0.75 | 0.75 | 0.75 | 0.75 |
|  | melting point [° C.] | 36 | 36 | 36 | 36 | 36 | 36 | 103 | 103 | 103 |
|  | charging method | liquid contact | liquid contact | liquid contact | liquid contact | liquid contact | liquid contact | liquid contact | liquid contact | liquid contact |
| testing oil repellency | oil repellency [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 6 | 6 | 6 | 6 | 6 | 6 |
|  | PAO method | ○ | ○ | ○ | ○ | ○ | ○ | ○ | ○ | ○ |
| oil mist resistance test | tabacoo smoke durability life [mg/sheet] | 35.2 | 38.5 | 40.3 | 36.7 | 37.8 | 40.9 | 35.1 | 38.7 | 41.5 |
|  | PAO durability life [mg/sheet] | 27.2 | 31.5 | 33.2 | 27.8 | 30.9 | 33.1 | 28.1 | 31.2 | 33.3 |
| collective efficiency test | efficiency after charging [%] | 98.00 | 98.30 | 99.10 | 97.97 | 98.30 | 99.30 | 98.10 | 98.50 | 99.10 |
|  | efficiency with no charge [%] | 31.0 | 31.5 | 30.5 | 30.2 | 30.3 | 31.5 | 31.3 | 33.1 | 30.5 |
|  | performanfce increase [%] | 1054 | 1077 | 1295 | 1084 | 1129 | 1311 | 1056 | 1045 | 1295 |

TABLE 3-8

|  | | Example 3-46 | Example 3-47 | Example 3-48 | Example 3-49 | Example 3-50 | Example 3-51 | Example 3-52 | Example 3-53 | Example 3-54 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 12.5 | 0.01 | 5 | 12.5 | 0.01 | 5 | 12.5 |
|  | process method | solution | solution | solution | solution | solution | solution | solution | solution | solution |
|  | polytetrafluoroetylene | n-C$_{16}$F$_{34}$ | n-C$_{16}$F$_{34}$ | n-C$_{16}$F$_{34}$ | n-C$_{20}$F$_{42}$ | n-C$_{20}$F$_{42}$ | n-C$_{20}$F$_{42}$ | Cefral Lube V | Cefral Lube V | Cefral Lube V |
|  | deposition amount [g/m$^2$] | 0.75 | 0.75 | 0.75 | 0.75 | 0.75 | 0.75 | 0.75 | 0.75 | 0.75 |
|  | melting point [° C.] | 125 | 125 | 125 | 167 | 167 | 167 | 100-290 | 100-290 | 100-290 |
|  | charging method | liquid contact | liquid contact | liquid contact | liquid contact | liquid contact | liquid contact | liquid contact | liquid contact | liquid contact |
| testing oil repellency | oil repellency [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 5 | 5 | 5 | 5 | 5 | 5 |
|  | PAO method | ○ | ○ | ○ | ○ | ○ | ○ | ○ | ○ | ○ |
| oil mist resistance test | tabacoo smoke durability life [mg/sheet] | 35.6 | 39.8 | 40.8 | 34.2 | 39.3 | 41.1 | 37.2 | 41.5 | 43.2 |
|  | PAO durability life [mg/sheet] | 27.6 | 31.2 | 33.1 | 27.3 | 31.9 | 33.2 | 28.1 | 33.2 | 34.2 |
| collective efficiency test | efficiency after charging [%] | 97.71 | 98.55 | 99.31 | 97.75 | 98.75 | 99.35 | 98.53 | 99.20 | 99.56 |
|  | efficiency with no charge [%] | 31.5 | 30.3 | 31.2 | 30.5 | 30.8 | 30.8 | 30.4 | 33.3 | 30.5 |
|  | performanfce increase [%] | 998 | 1173 | 1331 | 1043 | 1190 | 1368 | 1164 | 1192 | 1491 |

TABLE 3-9

|  | | Example 3-55 | Example 3-56 | Example 3-57 | Example 3-58 | Example 3-59 | Example 3-60 | Example 3-61 | Example 3-62 | Example 3-63 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | n-C$_{10}$F$_{22}$ | n-C$_{10}$F$_{22}$ | n-C$_{10}$F$_{22}$ | n-C$_{12}$F$_{26}$ | n-C$_{12}$F$_{26}$ | n-C$_{12}$F$_{26}$ | n-C$_{14}$F$_{30}$ | n-C$_{14}$F$_{30}$ | n-C$_{14}$F$_{30}$ |
|  | deposition amount [g/m$^2$] | 0.75 | 0.75 | 0.75 | 0.75 | 0.75 | 0.75 | 0.75 | 0.75 | 0.75 |
|  | melting point [° C.] | 36 | 36 | 36 | 76 | 76 | 76 | 103 | 103 | 103 |
|  | charging method | liquid contact | liquid contact | liquid contact | liquid contact | liquid contact | liquid contact | liquid contact | liquid contact | liquid contact |
| testing oil repellency | oil repellency [mN/m] | 25.4 | 25.4 | 25.4 | 25.4 | 25.4 | 25.4 | 25.4 | 25.4 | 25.4 |

TABLE 3-9-continued

|  |  | Example 3-55 | Example 3-56 | Example 3-57 | Example 3-58 | Example 3-59 | Example 3-60 | Example 3-61 | Example 3-62 | Example 3-63 |
|---|---|---|---|---|---|---|---|---|---|---|
|  | AATCC118 method [grade] | 7 | 7 | 7 | 7 | 7 | 7 | 6 | 6 | 6 |
|  | PAO method | ○ | ○ | ○ | ○ | ○ | ○ | ○ | ○ | ○ |
| oil mist resistance test | tabacoo smoke durability life [mg/sheet] | 38.8 | 42.2 | 44.2 | 37.7 | 42.1 | 43.5 | 36.1 | 41.1 | 43.2 |
|  | PAO durability life [mg/sheet] | 30.7 | 35.1 | 36.5 | 29.3 | 33.8 | 35.6 | 28.6 | 31.5 | 33.5 |
| collective efficiency test | efficiency after charging [%] | 98.10 | 98.72 | 99.31 | 98.31 | 98.85 | 99.22 | 98.45 | 98.31 | 99.21 |
|  | efficiency with no charge [%] | 29.8 | 30.3 | 30.9 | 30.8 | 32.1 | 30.5 | 30.5 | 32.1 | 31.5 |
|  | performanfce increase [%] | 1120 | 1207 | 1346 | 1108 | 1153 | 1334 | 1145 | 1054 | 1280 |

TABLE 3-10

|  |  | Example 3-64 | Example 3-65 | Example 3-66 | Example 3-67 | Example 3-68 | Example 3-69 | Example 3-70 | Example 3-71 | Example 3-72 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 15 | 0.01 | 5 | 15 | 0.01 | 5 | 15 |
|  | process method | vavor deposition | vavor deposition | vavor deposition | vavor deposition | vavor deposition | vavor deposition | vavor deposition | vavor deposition | vavor deposition |
|  | polytetrafluoroetylene | n-$C_{16}F_{34}$ | n-$C_{16}F_{34}$ | n-$C_{16}F_{34}$ | n-$C_{20}F_{42}$ | n-$C_{20}F_{42}$ | n-$C_{20}F_{42}$ | Cefral Lube V | Cefral Lube V | Cefral Lube V |
|  | deposition amount [g/m$^2$] | 0.75 | 0.75 | 0.75 | 0.75 | 0.75 | 0.75 | 0.75 | 0.75 | 0.75 |
|  | melting point [° C.] | 125 | 125 | 125 | 167 | 167 | 167 | 100-290 | 100-290 | 100-290 |
|  | charging method | liquid contact | liquid contact | liquid contact | liquid contact | liquid contact | liquid contact | Liquid contact | liquid contact | liquid contact |
| testing oil repellency | oil repellency [mN/m] | 25.4 | 25.4 | 25.4 | 25.4 | 25.4 | 25.4 | 25.4 | 25.4 | 25.4 |
|  | AATCC118 method [grade] | 6 | 6 | 6 | 6 | 6 | 6 | 6 | 6 | 6 |
|  | PAO method | ○ | ○ | ○ | ○ | ○ | ○ | ○ | ○ | ○ |
| oil mist resistance test | tabacoo smoke durability life [mg/sheet] | 35.5 | 40.1 | 42.6 | 35.3 | 40.5 | 42.1 | 36.1 | 39.6 | 43.5 |
|  | PAO durability life [mg/sheet] | 28.3 | 31.3 | 33.1 | 26.3 | 31.5 | 33.6 | 28.5 | 31.5 | 34.1 |
| collective efficiency test | efficiency after charging [%] | 97.56 | 98.85 | 99.69 | 97.89 | 98.78 | 99.31 | 98.61 | 98.96 | 99.87 |
|  | efficiency with no charge [%] | 31.3 | 30.6 | 32.2 | 31.0 | 31.1 | 30.4 | 30.5 | 31.2 | 30.6 |
|  | performanfce increase [%] | 989 | 1222 | 1486 | 1040 | 1183 | 1373 | 1175 | 1221 | 1819 |

TABLE 3-11

|  |  | Comparative Example 3-15 | Comparative Example 3-16 | Comparative Example 3-17 | Comparative Example 3-18 | Comparative Example 3-19 | Comparative Example 3-20 | Comparative Example 3-21 |
|---|---|---|---|---|---|---|---|---|
|  | carrier | PP | PP | PP | PP | PP | PP | PP |
|  | Irganox1010 content [wt %] | — | 0.01 | 5 | 12.5 | 20 | 20 | 20 |
|  | process method | non-proceeded | non-proceeded | non-proceeded | non-proceeded | non-proceeded | solution | vavor deposition |
|  | polytetrafluoroetylene | — | — | — | — | — | Cefral Lube V | Cefral Lube V |
|  | deposition amount [g/m$^2$] | 0 | 0 | 0 | 0 | 0 | 0.75 | 0.75 |
|  | melting point [° C.] | — | — | — | — | — | 100-290 | 100-290 |
|  | charging method | liquid contact | liquid contact | liquid contact | liquid contact | liquid contact | liquid contact | liquid contact |
| testing oil repellency | oil repellency [mN/m] | 38.0 | 38.0 | 38.0 | 40.0 | 41.0 | 25.4 | 25.4 |
|  | AATCC118 method [grade] | 0 | 0 | 0 | 0 | 0 | 3 | 4 |

TABLE 3-11-continued

|  |  | Comparative Example 3-15 | Comparative Example 3-16 | Comparative Example 3-17 | Comparative Example 3-18 | Comparative Example 3-19 | Comparative Example 3-20 | Comparative Example 3-21 |
|---|---|---|---|---|---|---|---|---|
| oil mist resistance test | PAO method | X | X | X | X | X | ○ | ○ |
|  | tabacoo smoke durability life [mg/sheet] | 7.7 | 9.3 | 10.5 | 10.6 | 9.8 | 22.1 | 21.3 |
|  | PAO durability life [mg/sheet] | 9.8 | 11.8 | 12.1 | 10.5 | 9.5 | 20.5 | 20.1 |
| collective efficiency test | efficiency after charging [%] | 96.40 | 97.65 | 98.85 | 99.65 | 99.73 | 96.51 | 96.88 |
|  | efficiency with no charge [%] | 30.3 | 30.5 | 32.8 | 31.0 | 30.5 | 30.6 | 32.1 |
|  | performanfce increase [%] | 921 | 1031 | 1123 | 1524 | 1626 | 919 | 896 |

TABLE 3-12

|  |  | Comparative Example 3-22 | Comparative Example 3-23 | Comparative Example 3-24 | Comparative Example 3-25 | Comparative Example 3-26 | Comparative Example 3-27 | Comparative Example 3-28 | Comparative Example 3-29 | Comparative Example 3-30 |
|---|---|---|---|---|---|---|---|---|---|---|
|  | carrier | PP | PP | PP | PP | PP | PP | PP | PP | PP |
|  | Irganox1010 content [wt %] | 0.01 | 5 | 12.5 | 0.01 | 5 | 12.5 | 0.01 | 5 | 12.5 |
|  | process method | solution | solution | solution | vavor deposition | vavor deposition | vavor deposition | deposition | deposition | deposition |
|  | polytetrafluoroetylene | Lubron L-2 | Lubron L-2 | Lubron L-2 | Lubron L-2 | Lubron L-2 | Lubron L-2 | TG-5503 | TG-5503 | TG-5503 |
|  | deposition amount [g/m$^2$] | 0 | 0 | 0 | 0 | 0 | 0 | 0.95 | 0.95 | 0.95 |
|  | melting point [° C.] | 330 | 330 | 330 | 330 | 330 | 330 | — | — | — |
|  | charging method | liquid contact | liquid contact | liquid contact | liquid contact | liquid contact | liquid contact | liquid contact | liquid contact | liquid contact |
| testing oil repellency | oil repellency [mN/m] | 38.0 | 38.0 | 38.0 | 38.0 | 38.0 | 38.0 | 35.0 | 35.0 | 35.0 |
|  | AATCC118 method [grade] | 0 | 0 | 0 | 0 | 0 | 0 | 0 | 0 | 0 |
| oil mist resistance test | PAO method | X | X | X | X | X | X | X | X | X |
|  | tabacoo smoke durability life [mg/sheet] | 8.5 | 8.8 | 9.3 | 8.6 | 8.9 | 9.6 | 3.5 | 3.7 | 3.7 |
|  | PAO durability life [mg/sheet] | 9.1 | 11.1 | 11 | 8.5 | 11.2 | 12.1 | 2.9 | 3.1 | 2.9 |
| collective efficiency test | efficiency after charging [%] | 97.79 | 98.55 | 99.61 | 97.41 | 98.66 | 99.25 | 45.50 | 47.21 | 46.99 |
|  | efficiency with no charge [%] | 31.5 | 30.4 | 32.1 | 30.5 | 29.9 | 31.1 | 30.2 | 31.7 | 32.2 |
|  | performanfce increase [%] | 1008 | 1168 | 1433 | 1004 | 1214 | 1313 | 169 | 168 | 163 |

INDUSTRIAL APPLICABILITY

It is made possible to obtain an electret and a filter excellent in high electric charge property, oil repellency, and oil resistance without using PFOA, PFOS and analogous compounds thereof by simple apparatuses and processes.

The present invention makes it possible to provide an electret having high electric charge property and a heightened electrostatic charge retention rate to liquid particles of oil mist or the like by using simple apparatuses and processes, and a filter including the electret, and significantly contributes to industrial fields.

The invention claimed is:

1. An electret, comprising:
a carrier, and
polytetrafluoroethylene,
wherein the polytetrafluoroethylene has a melting point of 35° C. or higher and 320° C. or lower and is deposited on the carrier, and
wherein an electrostatic charge is imparted to at least one of the carrier and the polytetrafluoroethylene.

2. The electret according to claim 1, wherein the carrier contains 0.01 to 15.0 wt. % of at least one of a hindered amine-based additive and a triazine-based additive.

3. The electret according to claim 1, wherein the carrier contains 0.01 to 15.0 wt. % of a hindered phenol-based additive.

4. The electret according to claim 1, wherein the electrostatic charge is imparted by a liquid contact charging method.

5. The electret according to claim 1,
wherein the carrier is a fibrous material, and
wherein the polytetrafluoroethylene is deposited on the carrier by a solution method or a vapor deposition method.

6. The electret according to claim 1, wherein the carrier is a melt-blown nonwoven fabric made of a thermoplastic resin having a melting point of 320° C. or lower.

7. A filter comprising the electret according to claim 1.

8. The electret according to claim 1, wherein the particle diameter of polytetrafluoroethylene deposited on the carrier is 0.1 nm or more and 10 μm or less.

* * * * *